US012565866B2

(12) United States Patent
Miller et al.

(10) Patent No.: US 12,565,866 B2
(45) Date of Patent: ***Mar. 3, 2026

(54) GAS TURBINE ENGINE WITH THIRD STREAM

(71) Applicant: General Electric Company, Schenectady, NY (US)

(72) Inventors: Brandon W. Miller, Evendale, OH (US); Randy M. Vondrell, Evendale, OH (US); David M. Ostdiek, Evendale, OH (US); Craig W. Higgins, Evendale, OH (US); Alexander Simpson, Evendale, OH (US); William Bowden, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,142

(22) Filed: Dec. 20, 2024

(65) Prior Publication Data

US 2025/0122849 A1 Apr. 17, 2025

Related U.S. Application Data

(63) Continuation-in-part of application No. 18/888,873, filed on Sep. 18, 2024, which is a continuation-in-part
(Continued)

(51) Int. Cl.
*F02K 3/065* (2006.01)
*F02C 3/06* (2006.01)
(52) U.S. Cl.
CPC ............... *F02K 3/065* (2013.01); *F02C 3/06* (2013.01)

(58) Field of Classification Search
CPC . F02K 3/02; F02K 3/025; F02K 3/065; F02C 3/06; F02C 3/107; F02C 7/36
See application file for complete search history.

(56) References Cited

U.S. PATENT DOCUMENTS 2,999,630 A 9/1961 Warren et al.
3,528,250 A 9/1970 Johnson
(Continued)

FOREIGN PATENT DOCUMENTS

CN 1204005 A 1/1999
CN 101657607 A 2/2010
(Continued)

OTHER PUBLICATIONS

Crigler, Application of Theodorsen's Theory to Propeller Design, NACA (National Advisory Committee for Aeronautics) Report 924, 1948, pp. 83-99.
(Continued)

*Primary Examiner* — Steven M Sutherland
(74) *Attorney, Agent, or Firm* — Klarquist Sparkman, LLP

(57) ABSTRACT

A gas turbine engine includes a turbomachine defining an engine inlet to an inlet duct, a fan duct inlet to a fan duct, and a core inlet to a core duct; a primary fan driven by the turbomachine; and a secondary fan located downstream of the primary fan within the inlet duct. The gas turbine engine defines a thrust to power airflow ratio between 3.5 and 100 and a core bypass ratio between 0.1 and 10. The thrust to power airflow ratio is a ratio of airflow through a bypass passage over the turbomachine plus airflow through the fan duct to airflow through the core duct. The core bypass ratio is a ratio of airflow through the fan duct to airflow through
(Continued)

the core duct. The fan duct includes an exhaust nozzle having a plurality of chevrons disposed at its aft end to define an exhaust outlet.

20 Claims, 21 Drawing Sheets

Related U.S. Application Data of application No. 18/675,270, filed on May 28, 2024, which is a continuation of application No. 17/879, 384, filed on Aug. 2, 2022, now Pat. No. 12,031,504.

(56) References Cited

U.S. PATENT DOCUMENTS

| | | | |
|---|---|---|---|
| 3,540,682 A | 11/1970 | Dibble et al. | |
| 3,542,152 A | 11/1970 | Adamson et al. | |
| 3,750,402 A | 8/1973 | Vdoviak et al. | |
| 4,010,608 A | 3/1977 | Simmons | |
| 4,043,121 A | 8/1977 | Thomas et al. | |
| 4,446,696 A | 5/1984 | Sargisson et al. | |
| 4,486,146 A | 12/1984 | Campion | |
| 4,569,199 A | 2/1986 | Klees et al. | |
| 4,607,657 A | 8/1986 | Hirschkron | |
| 4,784,575 A | 11/1988 | Nelson et al. | |
| 4,860,537 A | 8/1989 | Taylor | |
| 4,892,269 A | 1/1990 | Greco et al. | |
| 4,907,946 A | 3/1990 | Ciokajlo et al. | |
| 4,916,894 A | 4/1990 | Adamson et al. | |
| 4,976,102 A | 12/1990 | Taylor | |
| 5,054,998 A | 10/1991 | Davenport | |
| 5,190,441 A | 3/1993 | Murphy et al. | |
| 5,197,855 A | 3/1993 | Magliozzi et al. | |
| 5,259,187 A | 11/1993 | Dunbar et al. | |
| 5,261,227 A | 11/1993 | Giffin, III | |
| 5,345,760 A | 9/1994 | Giffin, III | |
| 5,457,346 A | 10/1995 | Blumberg et al. | |
| 5,950,308 A | 9/1999 | Koff et al. | |
| 6,339,927 B1 | 1/2002 | DiPietro, Jr. | |
| 6,360,528 B1 | 3/2002 | Brausch et al. | |
| 6,547,518 B1 | 4/2003 | Czachor et al. | |
| 6,612,106 B2 | 9/2003 | Balzer | |
| 6,763,654 B2 | 7/2004 | Orlando et al. | |
| 6,792,758 B2 | 9/2004 | Dowman | |
| 7,065,957 B2 | 6/2006 | Balzer | |
| 7,559,191 B2 | 7/2009 | Parks | |
| 7,658,063 B1 | 2/2010 | Matheny | |
| 7,762,766 B2 | 7/2010 | Shteyman et al. | |
| 8,256,202 B1 | 9/2012 | Paulino | |
| 8,276,392 B2 | 10/2012 | van der Woude | |
| 8,382,430 B2 | 2/2013 | Parry et al. | |
| 8,459,035 B2 | 6/2013 | Smith et al. | |
| 8,689,538 B2 | 4/2014 | Sankrithi et al. | |
| 8,762,766 B2 | 6/2014 | Ferguson et al. | |
| 8,876,465 B2 | 11/2014 | Stretton | |
| 8,910,465 B2 | 12/2014 | Snyder | |
| 8,943,796 B2 | 2/2015 | McCaffrey | |
| 8,967,967 B2 | 3/2015 | Stretton et al. | |
| 9,017,028 B2 | 4/2015 | Fabre | |
| 9,045,996 B2 | 6/2015 | Anghel et al. | |
| 9,057,328 B2 | 6/2015 | Kupratis | |
| 9,096,312 B2 | 8/2015 | Moxon | |
| 9,097,134 B2 | 8/2015 | Ferch et al. | |
| 9,506,423 B2 | 11/2016 | Izquierdo et al. | |
| 9,534,538 B1 | 1/2017 | Cerny | |
| 9,677,501 B2 | 6/2017 | Pierluissi et al. | |
| 9,759,160 B2 | 9/2017 | Sankrithi et al. | |
| 9,845,768 B2 | 12/2017 | Pesyna et al. | |
| 9,863,366 B2 | 1/2018 | Froemming et al. | |
| 9,909,506 B2 | 3/2018 | Kupratis | |
| 9,926,081 B2 | 3/2018 | Vlastuin | |
| 9,951,721 B2 | 4/2018 | Kupratis et al. | |
| 9,982,555 B2 | 5/2018 | Thet et al. | |
| 9,995,314 B2 | 6/2018 | Miller et al. | |
| 10,077,660 B2 | 9/2018 | Hoefer et al. | |
| 10,090,676 B2 | 10/2018 | Knowles et al. | |
| 10,126,062 B2 | 11/2018 | Cerny et al. | |
| 10,184,400 B2 | 1/2019 | Cerny et al. | |
| 10,197,008 B2 | 2/2019 | Roberge | |
| 10,202,865 B2 | 2/2019 | Breeze-Stringfellow et al. | |
| 10,253,648 B2 | 4/2019 | Bentley et al. | |
| 10,260,419 B2 | 4/2019 | Cerny et al. | |
| 10,263,550 B2 | 4/2019 | Thet et al. | |
| 10,344,674 B2 | 7/2019 | Cerny et al. | |
| 10,364,750 B2 | 7/2019 | Rambo | |
| 10,378,477 B2 | 8/2019 | Pesyna | |
| 10,378,478 B2 | 8/2019 | Roberge | |
| 10,443,436 B2 | 10/2019 | Miller et al. | |
| 10,458,247 B2 | 10/2019 | Charbonnier et al. | |
| 10,487,739 B2 | 11/2019 | Miller et al. | |
| 10,644,630 B2 | 5/2020 | Smith et al. | |
| 10,787,996 B2 | 9/2020 | Kupratis et al. | |
| 10,907,495 B2 | 2/2021 | Breeze-Stringfellow et al. | |
| 11,236,701 B2 | 2/2022 | Sidelkovskiy et al. | |
| 11,261,827 B2 | 3/2022 | Roberge | |
| 11,306,682 B2 | 4/2022 | Harvey | |
| 11,313,276 B2 | 4/2022 | Emmanouil et al. | |
| 2004/0197187 A1 | 10/2004 | Usab et al. | |
| 2004/0234372 A1 | 11/2004 | Shahpar | |
| 2005/0109012 A1 | 5/2005 | Johnson | |
| 2005/0241292 A1 | 11/2005 | Taylor et al. | |
| 2007/0186535 A1 | 8/2007 | Powell et al. | |
| 2007/0251212 A1 | 11/2007 | Tester | |
| 2009/0078819 A1 | 3/2009 | Guering et al. | |
| 2010/0014977 A1 | 1/2010 | Shattuck | |
| 2010/0111674 A1 | 5/2010 | Sparks | |
| 2010/0251726 A1 | 10/2010 | Jones et al. | |
| 2010/0257865 A1* | 10/2010 | Mengle | F02K 1/48 |
| | | | 60/770 |
| 2010/0326050 A1 | 12/2010 | Schilling et al. | |
| 2010/0329856 A1 | 12/2010 | Hofer et al. | |
| 2011/0150659 A1 | 6/2011 | Micheli et al. | |
| 2011/0192166 A1 | 8/2011 | Mulcaire | |
| 2012/0177493 A1 | 7/2012 | Fabre | |
| 2013/0098050 A1 | 4/2013 | Kupratis | |
| 2013/0104521 A1 | 5/2013 | Kupratis | |
| 2013/0104522 A1 | 5/2013 | Kupratis | |
| 2013/0104560 A1 | 5/2013 | Kupratis | |
| 2014/0133982 A1 | 5/2014 | Dejeu et al. | |
| 2014/0263737 A1 | 9/2014 | Pierluissi et al. | |
| 2014/0345253 A1 | 11/2014 | Dawson et al. | |
| 2014/0345254 A1 | 11/2014 | Dawson et al. | |
| 2015/0003993 A1 | 1/2015 | Kim et al. | |
| 2015/0098813 A1 | 4/2015 | Jarrett, Jr. | |
| 2015/0121893 A1 | 5/2015 | Kupratis | |
| 2015/0284070 A1 | 10/2015 | Breeze-Stringfellow et al. | |
| 2015/0291276 A1 | 10/2015 | Zatorski et al. | |
| 2016/0010487 A1 | 1/2016 | Breeze-Stringfellow et al. | |
| 2016/0053692 A1 | 2/2016 | Izquierdo | |
| 2016/0090863 A1 | 3/2016 | Diaz et al. | |
| 2016/0160647 A1 | 6/2016 | Hofer et al. | |
| 2016/0230658 A1 | 8/2016 | Hanlon et al. | |
| 2016/0298550 A1 | 10/2016 | Kupratis et al. | |
| 2016/0333734 A1 | 11/2016 | Bowden et al. | |
| 2016/0347463 A1 | 12/2016 | Negulescu | |
| 2017/0051678 A1 | 2/2017 | Becker, Jr. | |
| 2017/0051680 A1 | 2/2017 | Becker, Jr. et al. | |
| 2017/0102006 A1 | 4/2017 | Miller et al. | |
| 2017/0114721 A1 | 4/2017 | Miller et al. | |
| 2017/0167382 A1 | 6/2017 | Miller et al. | |
| 2017/0184027 A1 | 6/2017 | Moniz et al. | |
| 2017/0198719 A1 | 7/2017 | Cerny et al. | |
| 2018/0065727 A1 | 3/2018 | Gruber et al. | |
| 2018/0118364 A1 | 5/2018 | Golshany et al. | |
| 2018/0215475 A1 | 8/2018 | Hurt et al. | |
| 2018/0283795 A1 | 10/2018 | Cerny et al. | |
| 2019/0136710 A1 | 5/2019 | Breeze-Stringfellow et al. | |
| 2019/0153952 A1 | 5/2019 | Niergarth et al. | |
| 2019/0153953 A1 | 5/2019 | Niergarth et al. | |
| 2019/0218971 A1 | 7/2019 | Niergarth et al. | |
| 2019/0249599 A1 | 8/2019 | Sen et al. | |
| 2019/0257247 A1 | 8/2019 | Pal et al. | |
| 2019/0360401 A1 | 11/2019 | Rambo et al. | |

(56) References Cited

U.S. PATENT DOCUMENTS

| | | |
|---|---|---|
| 2020/0025109 A1 | 1/2020 | Stieger et al. |
| 2020/0095939 A1 | 3/2020 | Epstein |
| 2020/0116104 A1 | 4/2020 | Levisse et al. |
| 2020/0332718 A1 | 10/2020 | Rambo |
| 2021/0108573 A1 | 4/2021 | Sibbach et al. |
| 2021/0108595 A1 | 4/2021 | Khalid et al. |
| 2021/0108597 A1 | 4/2021 | Ostdiek et al. |
| 2021/0262416 A1 | 8/2021 | Pal et al. |
| 2022/0042463 A1 | 2/2022 | Molesini et al. |
| 2022/0056811 A1 | 2/2022 | Molesini et al. |
| 2022/0056916 A1 | 2/2022 | Stretton et al. |
| 2022/0106965 A1 | 4/2022 | Gallagher et al. |
| 2022/0119120 A1 | 4/2022 | Armstrong et al. |
| 2022/0154643 A1 | 5/2022 | Schwarz et al. |
| 2022/0162957 A1 | 5/2022 | Mohankumar et al. |
| 2022/0178365 A1 | 6/2022 | Klaus |
| 2022/0205409 A1 | 6/2022 | Acheson et al. |
| 2022/0213898 A1 | 7/2022 | Ohtaguro et al. |
| 2022/0235668 A1 | 7/2022 | Sanderson et al. |
| 2022/0235710 A1 | 7/2022 | Mouly |
| 2022/0235792 A1 | 7/2022 | Gallagher et al. |
| 2023/0167783 A1 | 6/2023 | Bowden et al. |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |
| EP | 1493900 A2 | 1/2005 |
| EP | 1988274 A2 | 11/2008 |
| EP | 2540989 A2 | 1/2013 |
| EP | 2562082 A2 | 2/2013 |
| EP | 3093443 A1 | 11/2016 |
| EP | 2971725 | 4/2022 |
| FR | 3074476 A1 | 6/2019 |
| FR | 3082230 A1 | 12/2019 |
| GB | 2100799 A | 1/1983 |
| GB | 2196390 A | 4/1988 |
| GB | 2461811 A | 1/2010 |
| JP | H0370698 A | 3/1991 |
| JP | 2006123880 A | 5/2006 |
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |
| WO | WO2011/094477 A2 | 8/2011 |
| WO | WO2011/107320 A1 | 9/2011 |
| WO | WO2014/143248 A1 | 9/2014 |
| WO | WO 2022/112536 | 6/2022 |
| WO | WO 2022/123142 | 6/2022 |
| WO | WO 2022/140040 | 6/2022 |
| WO | WO 2022/152994 | 7/2022 |

OTHER PUBLICATIONS

Kumar et al., CFD Analysis of Low Pressure Turbine Blade Using Vortex Generator Jets, Proceedings of 7th International Conference on Intelligent Systems and Control (ISCO 2013) IEEE Explore, Coimbatore, Tamil Nadu, India, Jan. 4-5, 2013, pp. 541-544. (https://ieeexplore.ieee.org/document/6481213).

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA/SAE/ASME/ASEE 28th Joint Propulsion Conference and Exhibit, Jul. 6-8, 1992, Nashville TN, pp. 1-9.

* cited by examiner

| R1/R3 | TPAR | CBR | RqRPrim.-FAN | RqRSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.71 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim. FAN | RqRSec. FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.497 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqRPrim.-FAN | RqRSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.32 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.73 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|-------|------|-----|--------------|-------------|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.173 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|---|---|---|---|---|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.273 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.22 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.422 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.27 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.272 | 37.5 | 1.55 | 0.35 | 0.55 |
| 5.272 | 37.5 | 1.55 | 0.35 | 0.55 |
| 3.477 | 37.5 | 1.55 | 0.25 | 0.65 |
| 3.529 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.74 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.76 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.92 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.528 | 56.5 | 6.05 | 0.25 | 0.55 |

FIG. 4F

| R1/R3 | TPAR | COR | RqRPrim.-FAN | RqRSec.-FAN |
|---|---|---|---|---|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.574 | 58.2 | 3.56 | 0.30 | 0.60 |
| 5.626 | 58.2 | 3.56 | 0.35 | 0.60 |
| 5.676 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | CBR | RqRPrim. FAN | RqRSec. FAN |
|-------|------|------|------|------|
| 5.205 | 70.4 | 6.24 | 0.25 | 0.60 |
| 4.745 | 70.7 | 7.16 | 0.25 | 0.60 |
| 3.483 | 71.2 | 8.79 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

GAS TURBINE ENGINE WITH THIRD STREAM

CROSS-REFERENCE TO RELATED APPLICATIONS

This application is a continuation-in-part application of U.S. application Ser. No. 18/888,873, filed Sep. 18, 2024, which is a continuation-in-part of U.S. application Ser. No. 18/675,270, filed May 28, 2024, which is a continuation application of U.S. application Ser. No. 17/879,384, filed Aug. 2, 2022, now U.S. Pat. No. 12,031,504, each of which is incorporated by reference herein in their entireties.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator. The turbomachine is mechanically coupled to the fan for driving the fan during operation.

In a typical turbofan aircraft gas turbine engine application for powering an aircraft in flight, a core exhaust nozzle is used for independently discharging the core exhaust gases inwardly from a concentric fan exhaust nozzle which discharges the fan air therefrom for producing thrust. The separate exhausts from the core nozzle and the fan nozzle are high velocity jets typically having maximum velocity during take-off operation of the aircraft with the engine operated under relatively high power. The high velocity jets interact with each other as well as with the ambient air and may produce substantial noise along the take-off path of the aircraft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

DETAILED DESCRIPTION

Figure 1:
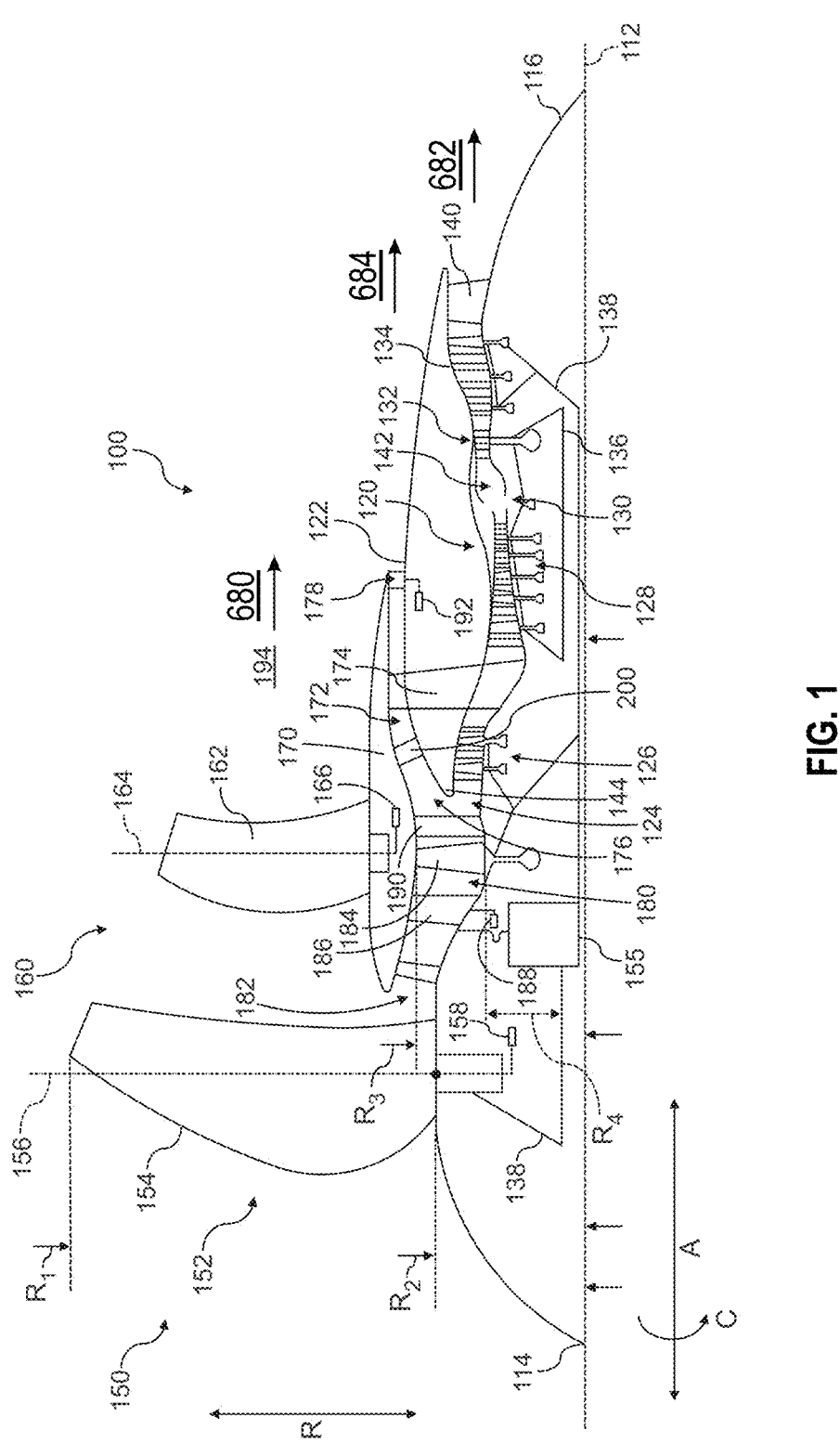
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The phrases "from X to Y" and "between X and Y" each refers to a range of values inclusive of the endpoints (i.e., refers to a range of values that includes both X and Y).

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "fluid" may be a gas or a liquid. The term "fluid communication" means that a fluid is capable of making the connection between the areas specified.

The term "cruise altitude" refers to an altitude between approximately 28,000 ft and approximately 45,000 ft. In certain embodiments, cruise altitude is expressed in flight levels based on a standard air pressure at sea level, in which a cruise flight condition is between FL280 and FL650. In certain other embodiments, cruise flight condition is between FL280 and FL450. In certain other embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In certain other embodiments, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

The term "fan pressure ratio" of a fan refers to a ratio of a fan discharge pressure to a fan inlet pressure as measured across the fan blades of the fan at a cruise flight condition.

References to "noise", "noise level", or "perceived noise", or variations thereof, are understood to include sound pressure levels (SPL) outside a fuselage, fuselage exterior noise levels, perceived noise levels, effective perceived noise levels (EPNL), instantaneous perceived noise levels (PNL(k)), or tone-corrected perceived noise levels (PNLT(k)), or one or more duration correction factors, tone correction factors, or other applicable factors, as defined by the Federal Aviation Administration (FAA), the European Union Aviation Safety Agency (EASA), the International Civil Aviation Organization (ICAO), Swiss Federal Office of Civil Aviation (FOCA), or committees thereof, or other equivalent regulatory or governing bodies. Where certain ranges of noise levels (e.g., in decibels, or dB) are provided herein, it will be appreciated that one skilled in the art will understand methods for measuring and ascertaining of such levels without ambiguity or undue experimentation. Methods for measuring and ascertaining one or more noise levels as provided herein by one skilled in the art, with reasonable certainty and without undue experimentation, include, but are not limited to, understanding of measurement systems, frames of reference (including, but not limited to, distances, positions, angles, etc.) between the engine and/or aircraft relative to the measurement system or other perceiving body, or atmospheric conditions (including, but not limited to, temperature, humidity, dew point, wind velocity and vector, and points of reference for measurement thereof), as may be defined by the FAA, EASA, ICAO, FOCA, or other regulatory or governing body.

As used herein, the term "community noise" refers to an amount of noise produced by an engine and/or aircraft that is observed on the ground, typically in the community around an airport during a takeoff or landing.

As used herein, the term "first stream" or "free stream" refers to a stream that flows outside of the engine inlet and over a fan.

As used herein, the term "second stream" or "core stream" refers to a stream that flows through the engine inlet and the ducted fan and also travels through the core inlet and the core duct.

As used herein, the term "third stream" refers to a non-primary air stream that does not travel through the core inlet and the core duct. The third stream goes through at least one stage of the turbomachine, e.g., the ducted fan. The third stream is capable of increasing fluid energy to produce a minority of total propulsion system thrust.

The term "bypass passage" refers generally to a passage with an airflow from a fan of the gas turbine engine that flows over an upstream-most inlet to a turbomachine of the gas turbine engine (e.g., outside of the core engine). For example, in a ducted gas turbine engine, the bypass passage is the passage defined between an outer nacelle (surrounding the fan of the gas turbine engine) and one or more cowls inward of the outer nacelle (e.g., a fan cowl, a core cowl, or both if both are present), and in an unducted gas turbine engine, the bypass passage refers to an open sided passage (i.e., not explicitly defined by structure such as an outer nacelle) where airflow from the fan passes over an upstream-most inlet to the turbomachine. The bypass passage is defined at least in part by a primary fan outer fan area, which refers to an area defined by an annulus representing a portion of the fan located outward of an inlet splitter at the upstream-most inlet to the turbomachine (e.g., inlet splitter 196 of the fan cowl 170 in the embodiment of FIGS. 1 and 2). An airflow through the bypass passage of a ducted or an unducted engine refers to all of the airflow from the fan that is not provided through the upstream-most inlet to the turbomachine.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer. For example, in an engine certified by the Federal Aviation Administration ("FAA"), the rated speed refers to a rotation speed of the engine during the highest sustainable and continuous power operation in the certification documents, such as a rotational speed of the gas turbine engine when operating under a maximum continuous operation.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term "ducted" is used herein to describe a fan that is at least partially enclosed (e.g., by a nacelle or other structure).

The term "open rotor" is used herein to describe a gas turbine engine with an unducted primary fan.

The term "geared" is used herein to describe a gas turbine engine with a reduction gearbox between the primary fan and a driving turbine.

The term "direct drive" is used herein to describe a gas turbine engine without a reduction gearbox between the primary fan and a driving turbine.

The term "variable pitch" is used herein to describe a gas turbine engine with a pitch change mechanism for changing a pitch of fan blades on a primary fan.

The term "fixed pitch" is used herein to describe a gas turbine engine without a pitch change mechanism for changing a pitch of fan blades on a primary fan.

The term "lower flight speed" is used herein to describe a gas turbine engine designed to operate at a flight speed less than 0.85 Mach.

The term "higher flight speed" is used herein to describe a gas turbine engine designed to operate at a flight speed higher than 0.85 Mach.

Generally, an aeronautical gas turbine engine includes a fan to provide a desired amount of thrust without overloading the fan blades (i.e., without increasing a disk loading of the fan blades of the fan beyond a certain threshold), and therefore to maintain a desired overall propulsive efficiency for the gas turbine engine. Conventional gas turbine engine design practice has been to provide an outer nacelle surrounding the fan to provide relatively efficient thrust for the gas turbine engine. Such a configuration, sometimes referred to as a turbofan engine configuration, may generally limit a permissible size of the fan (i.e., a diameter of the fan). However, the inventors of the present disclosure have found that gas turbine engine design is now driving the diameter of the fan higher to provide as much thrust for the gas turbine engine as possible from the fan to improve an overall propulsive efficiency of the gas turbine engine.

By increasing the fan diameter, an installation of the gas turbine engine becomes more difficult. In addition, if an outer nacelle is maintained, the outer nacelle may become weight prohibitive with some larger diameter fans. Further, as the need for gas turbine engines to provide more thrust continues, the thermal demands on the gas turbine engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiency for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc. during the design of several different types of gas turbine engines, including, for example, the gas turbine engines described below with reference to FIGS. 1 and 6-8. During the course of this practice of studying and evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

The inventors of the present disclosure further found while designing the above-disclosed three stream gas turbine engine that one or more mixing devices (e.g., a plurality of chevrons), described with reference to FIGS. 9 through 18, could be added at an aft end of an exhaust nozzle to define an exhaust outlet and the third stream can be directed through the chevrons at the aft end of the exhaust nozzle.

The inventors found that the mixing devices (e.g., chevrons) of the present disclosure promote jet exhaust mixing between adjacent flow streams, e.g., the first stream and the third stream that travels out the exhaust nozzle of the fan duct having chevrons. The inventors discovered that the mixing promoted by the chevrons reduces jet noise, e.g., cabin and community noise, and enables a quieter overall engine and aircraft.

Furthermore, the inventors determined that the chevrons of the present disclosure penetrate into the streams to promote mixing and also reduce shock cell noise resulting in cabin noise reduction during high speed cruise conditions.

Thus, the inventors discovered that adding mixing devices (e.g., chevrons) to gas turbine engines having desirable thrust to power airflow ratios and/or desirable core bypass ratios unexpectedly resulted in gas turbine engines with improved packaging concerns, weight concerns, and thermal management capabilities while simultaneously exhibiting reduced noise emissions.

Referring now to FIG. 1, a schematic cross-sectional view of a gas turbine engine 100 is provided according to an example embodiment of the present disclosure. Particularly, FIG. 1 provides a gas turbine engine having a rotor assembly with a single stage of unducted rotor blades. In such a manner, the rotor assembly may be referred to herein as an unducted fan, or the entire engine 100 may be referred to as an unducted gas turbine engine, or an engine having an open rotor propulsion system 102. In addition, the engine 100 of FIG. 1 includes a third stream extending from the compressor section to a rotor assembly flowpath over the turbomachine, as will be explained in more detail below.

A pressure ratio of the third stream may be higher than that of the primary propulsion stream (e.g., a bypass propulsion stream). The thrust may be produced through a dedicated nozzle or through mixing of an airflow through a third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120, also referred to as a "core" of the engine 100, and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. The fan 152 can be directly coupled with the LP shaft 138, e.g., in a direct-drive configuration. However, for the embodiment shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_2$ divided by $R_1$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blade axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g., coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_4$ divided by $R_3$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil, or fuel.

Although not depicted, in certain exemplary embodiments, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
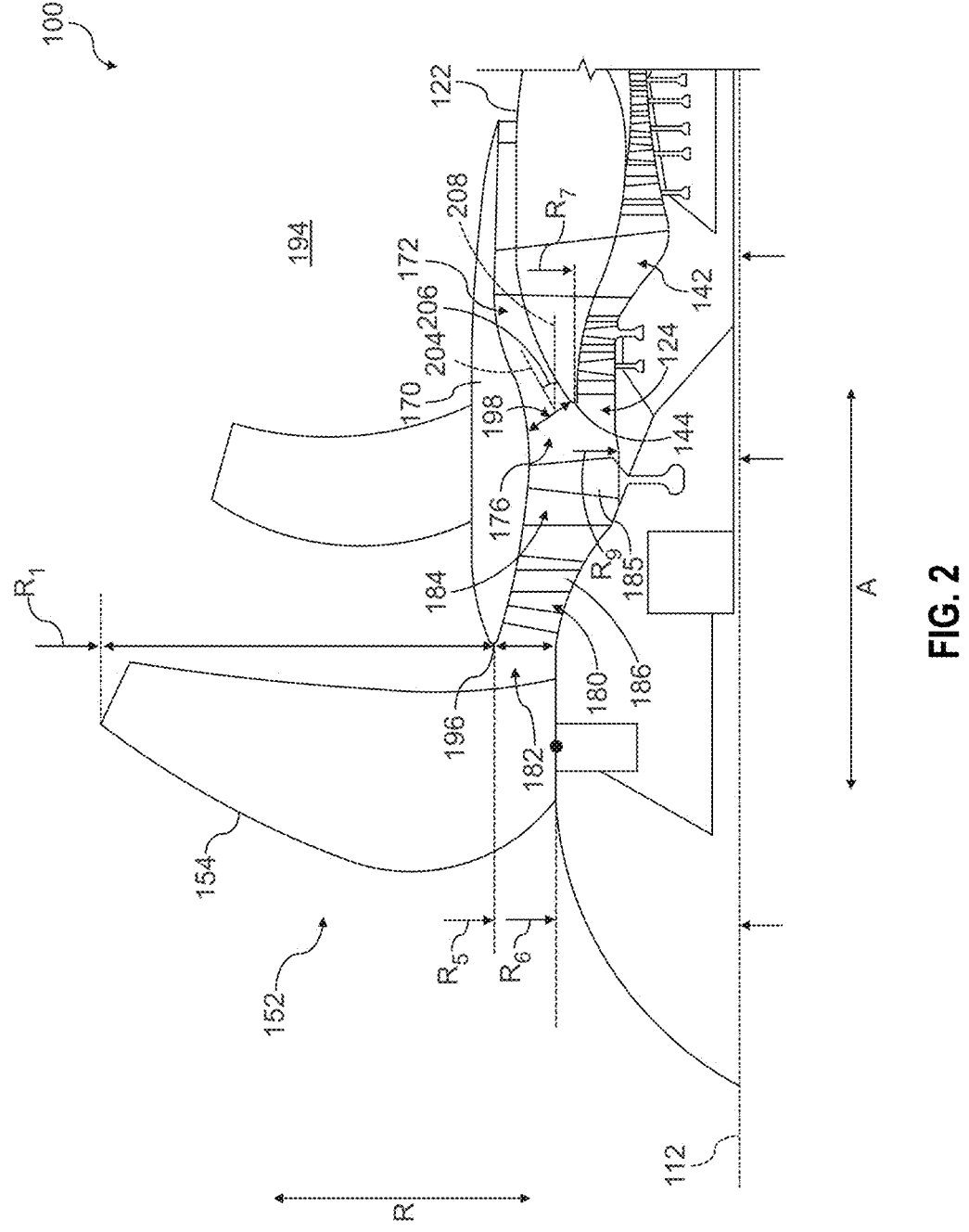
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above includes a primary fan, or rather fan 152 having fan blades 154, and a secondary fan, or rather ducted fan 184 having fan blades 185. Airflow from the fan 152 is split between a bypass region 194 (as defined below) and the inlet duct 180 by an inlet splitter 196. Airflow from the ducted fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula: $\pi R_1^2 - \pi R_5^2$.

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula: $\pi R_5^2 - \pi R_6^2$.

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_5$ (see FIG. 3). The leading edge radius, $R_7$, is defined along the radial direction R from the longitudinal axis 112 to the leading edge 144.

Figure 3:
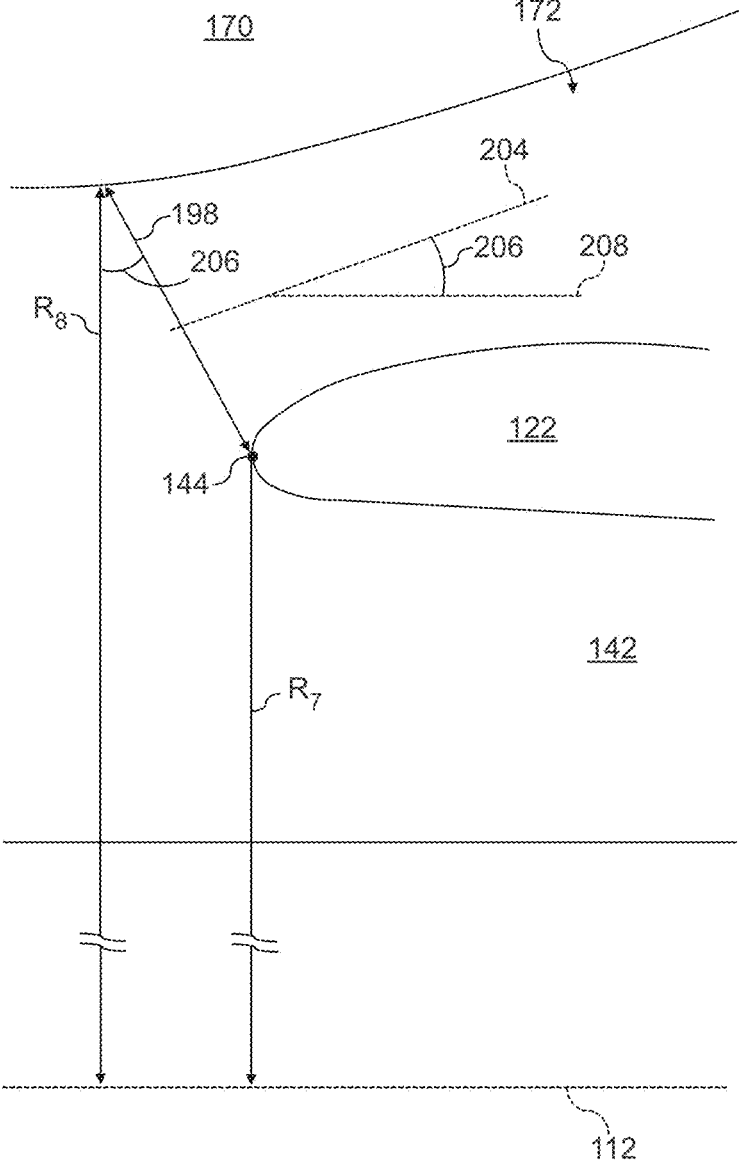
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_5$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi\left(R_8^2 - R_7^2\right)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula: $\pi R_7^2 - \pi R_9^2$.

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage of the engine 100 and through the fan duct 172 to an airflow through the core duct 142. The bypass passage (not separately labeled) is located within the bypass region 194 and refers to a passage where airflow from the fan 152 passes over the inlet duct 180. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of airflow through the engine's bypass passage can be determined using a fan pressure ratio for the fan 152, a rotational speed of the fan 152, or both while the engine is operating at the rated speed during standard day operating conditions, and the primary fan outer fan area, $A_{P\_Out}$. The amount of airflow through the inlet duct 180 can be determined using a fan pressure ratio for the fan 152, a rotational speed of the fan 152, or both while operating at a rated speed during standard day operating conditions, and the primary fan inner fan area, $A_{P\_In}$. The amount of airflow through the fan duct 172 and the amount of airflow through the core duct 142 can be determined based on the amount of airflow through the inlet duct 180 while the engine is operating at the rated speed during standard day operating conditions; a fan pressure ratio, a rotational speed, or both of the ducted fan 184 while the engine is operating at the rated speed during standard day operating conditions; and the secondary fan outer fan area, $A_{S\_Out}$, and the secondary fan inner fan area, $A_{S\_In}$.

As alluded to earlier, the inventors discovered, unexpectedly during the course of gas turbine engine design—i.e., designing gas turbine engines having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$TPAR = (A_B + A_{3S})/A_C \tag{1}$$

-continued $$CBR = A_{3S}/A_C \qquad (2)$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and Ac is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

Figure 5A:
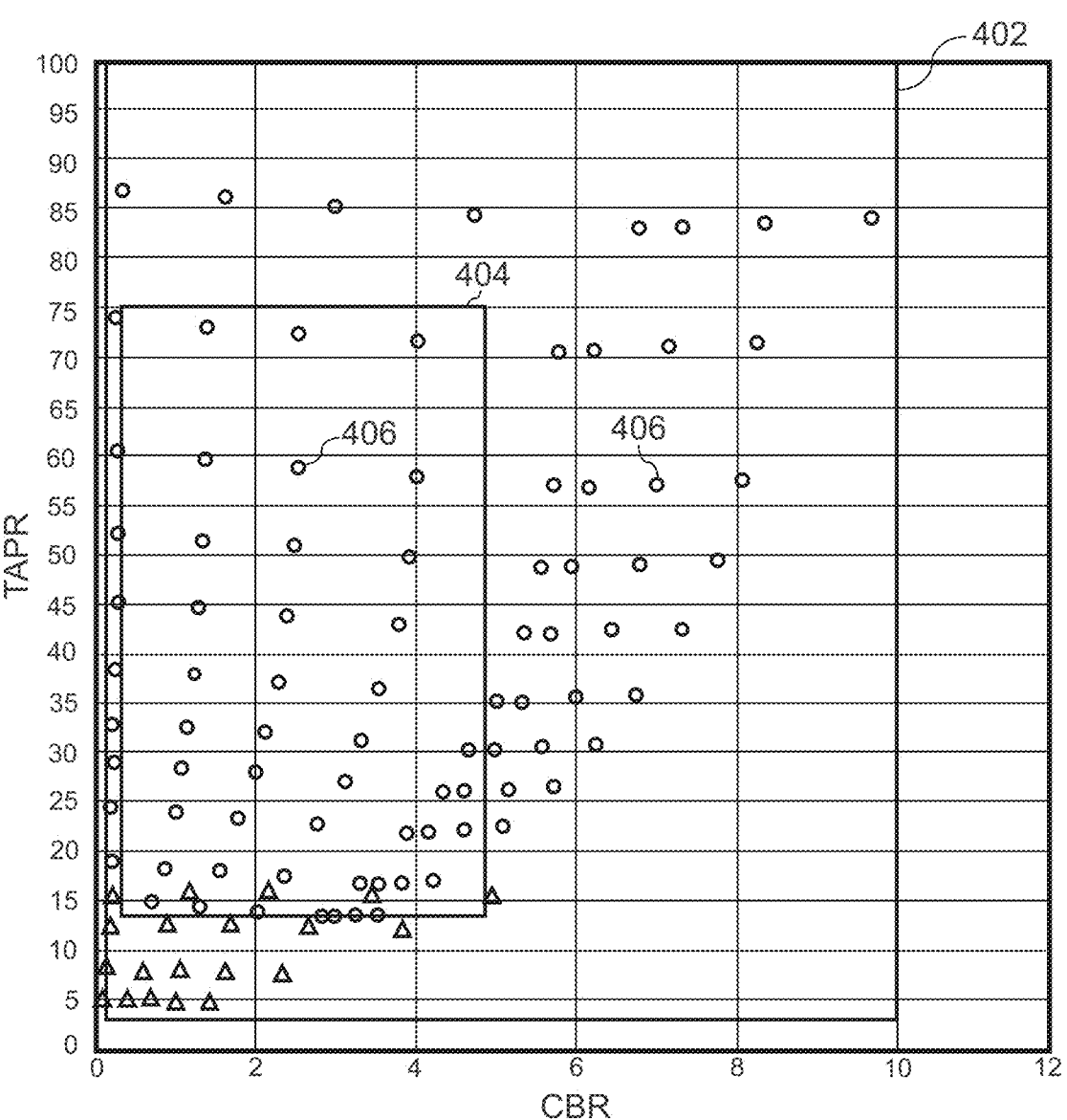
FIGS. 5A through 5B are graphs depicting a range of thrust to power airflow ratios and core bypass ratios in accordance with various example embodiments of the present disclosure.
Figure 5B:
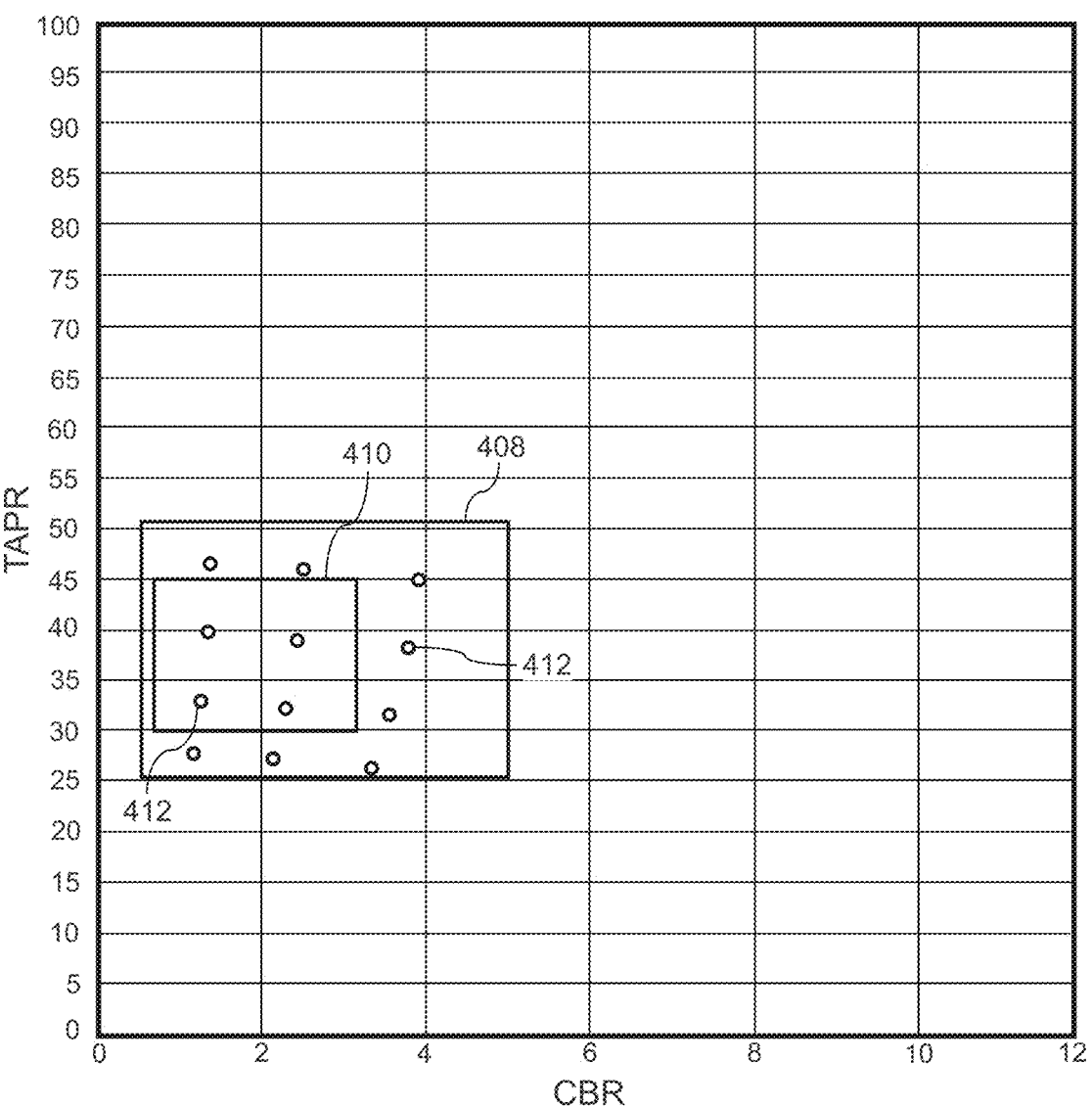

Referring now to FIGS. 4A through 4H and 5A through 5B, the relationships between the various parameters of Expressions (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through 5B. FIGS. 5A through 5B are plots of gas turbine engines in accordance with one or more exemplary embodiments of the present disclosure, showing the TPAR (Y-Axis) and the CBR (X-axis). FIGS. 5A through 5B highlight preferred subranges.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure, including unducted gas turbine engines, ducted gas turbine engines (turbofan engines), and turboprop engines. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across the variety of engine types to achieve propulsive efficiency, while still providing packaging and weight benefits, thermal benefits, etc.

Referring particularly to FIG. 5B, a third range 408 and a fourth range 410 are provided, and exemplary embodiments 412 are plotted. The exemplary embodiments 412 include a variety of unducted gas turbine engines in accordance with aspects of the present disclosure. In particular, the exemplary embodiments 412 include a variety of gas turbine engines having an unducted primary fan, similar to the exemplary embodiments described herein with reference to FIGS. 1 and 10-12. The third range 408 corresponds to a TPAR between 30 and 56 and a CBR between 0.3 and 5. The third range 408 captures the benefits of the present disclosure for unducted gas turbine engines. The fourth range 410 corresponds to a TPAR between 35 and 50 and a CBR between 0.5 and 3. The fourth range 410 may provide more desirable TPAR and CBR relationships for the unducted gas turbine engines to achieve propulsive efficiency, while still providing packaging and weight benefits, thermal benefits, etc.

As will be appreciated, the unducted gas turbine engines may have, on the whole, a higher TPAR as compared to the ducted gas turbine engines, enabled by a lack of an outer nacelle or other casing surrounding a primary fan. The range of CBR values in the fourth range 410 isn't as large as the range of CBR values in the third range 408, as in the embodiments with a higher TPAR, the CBR needs to be lower to provide a necessary amount of airflow to a core of the engine without exceeding temperature thresholds or requiring an undesired reduction in a size of the primary fan.

The inventors of the present disclosure have found that the TPAR values and CBR values in the third and fourth ranges 408, 410 shown may provide a desirable propulsive benefit, while still enabling operation of the core in a reasonable manner, and balancing installation and thermal load considerations.

TABLE 2, below, provides a summary of TPAR values and CBR values for various gas turbine engines in accordance with one or more exemplary aspects of the present disclosure.

TABLE 2

| Engine Type | TPAR Value | CBR Value |
|---|---|---|
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |
| Ducted, Direct Drive GTE (lower flight speed) | 8 to 15 | 0.3 to 1.8 |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

It will be appreciated that although the discussion above is generally relating to the engine 100 described above with reference to FIGS. 1 and 2, in various embodiments of the present disclosure, the relationships outlined above, e.g., expressions (1) and (2), may be applied to any other suitable engine architecture. For example, reference will now be made to FIGS. 6 through 8, each depicting schematically an engine architecture associated with the present disclosure.

Figure 6:
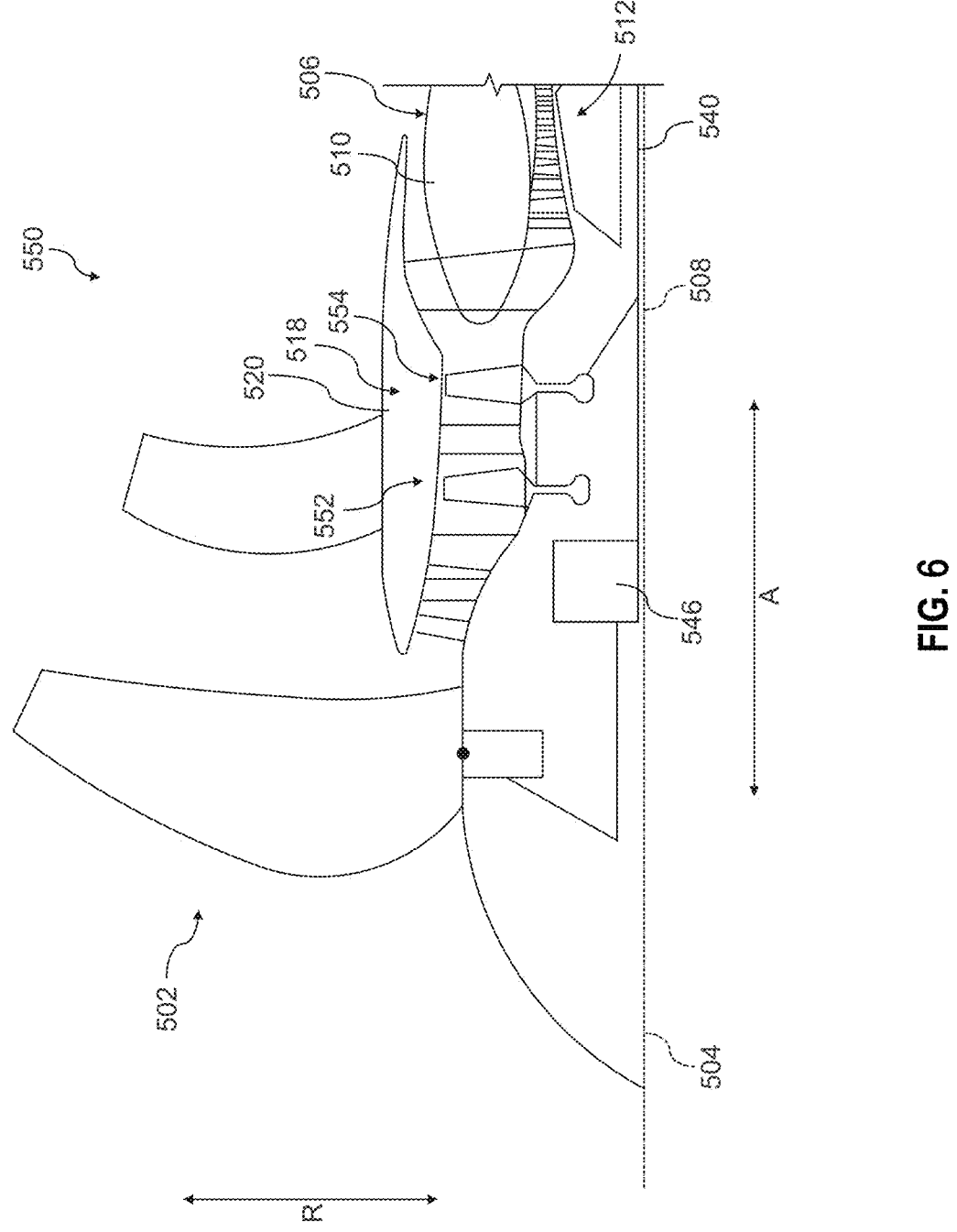
FIG. 6 is a schematic view of a gas turbine engine in accordance with another exemplary aspect of the present disclosure.

Referring now to FIG. 6, an unducted gas turbine engine 550 in accordance with another exemplary embodiment of the present disclosure is provided. The exemplary gas turbine engine 550 of FIG. 6 includes a rotor 502 rotatable about a rotor axis 504 and a turbomachine 506 rotatable about a longitudinal axis 508. The rotor axis 504 and the longitudinal axis 508 are aligned in the embodiment of FIG. 6. The rotor 502 corresponds to the "primary fan" described herein. The turbomachine 506 is surrounded at least in part by a core cowl 510 and includes a compressor section 512 (and, not shown, a combustion section and a turbine section in serial flow order with the compressor section 512). In addition to the rotor 502, the gas turbine engine 550 also includes a ducted mid-fan or secondary fan 518 and a fan cowl 520 surrounding the secondary fan 518.

Unlike the secondary fan 184 of the gas turbine engine 100 shown in FIG. 1, the secondary fan 518 of the gas turbine engine 550 is not configured as a single stage fan. Instead, the secondary fan 518 is configured as a multi-stage secondary fan, and more specifically still as a two-stage secondary fan having a total of two stages of rotating compressor rotor blades, and more specifically having a first stage 552 of secondary fan rotor blades and a second stage 554 of secondary fan rotor blades. Notably, with such a configuration, the turbomachine 506 does not include a separate low pressure compressor.

Additionally, in still other exemplary embodiments, the exemplary gas turbine engines disclosed herein may have other configurations. For example, referring now to FIG. 7, a gas turbine engine 551 in accordance with yet another exemplary embodiment of the present disclosure is provided. The exemplary gas turbine engine 551 of FIG. 7 may be configured in a similar manner as the exemplary gas turbine engine 100 described above with reference to, e.g., FIGS. 1 through 3.

Figure 7:
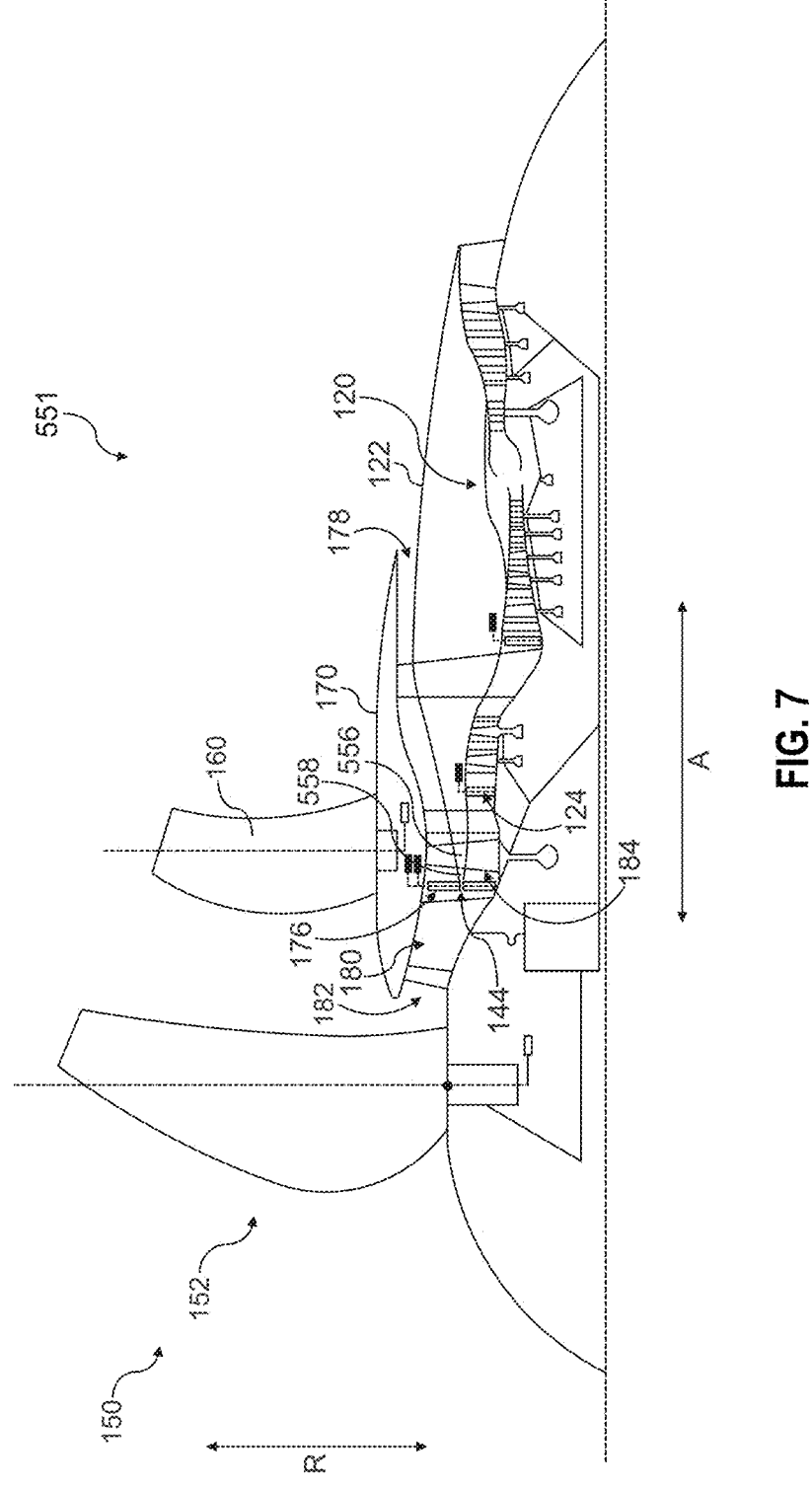
FIG. 7 is a schematic view of a gas turbine engine in accordance with yet another exemplary aspect of the present disclosure.

For example, the exemplary gas turbine engine 551 of FIG. 7 includes a turbomachine 120 and a rotor assembly, also referred to a fan section 150, positioned upstream thereof. The engine 551 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan exhaust nozzle 178 to produce propulsive thrust. The fan duct 172 extends from a leading edge 144 of the core cowl 122.

The engine 551 also defines an inlet duct 180. The inlet duct 180 extends between an engine inlet 182 and a core inlet 124. The engine inlet 182 is defined generally at the forward end of the fan cowl 170 and is positioned between a fan 152 of the fan section 150 and a fan guide vane array 160 along the axial direction A. The engine 551 further includes a ducted fan 184 with a plurality of fan blades located at least partially in the inlet duct 180.

However, for the embodiment of FIG. 7, the core cowl 122 carries forward to an aft edge of the fan blades of the ducted fan 184 and the fan blades themselves include an integral splitter 556. This may be termed a blade-on-blade configuration where inner and outer blades are effectively superimposed upon one another and may be unitarily formed or otherwise fabricated to achieve the split between streams.

The core cowl 122 further includes a section 558 extending forward past the fan blades of the ducted fan 184, such that the leading edge 144 is located forward of the fan blades of the ducted fan 184. With such an arrangement, the fan duct inlet 176 is also located forward of the fan blades of the ducted fan 184, and an outer portion of the fan blades along the radial direction R is positioned within the fan duct 172. With this configuration, a secondary fan outer fan area, $A_{S\_Out}$, may be calculated at the fan duct inlet 176 in the same manner discussed above with reference to, e.g., FIGS. 2 and 3.

Further, with such a configuration, the secondary fan inner fan area, $A_{S\_In}$, still refers to an area defined by an annulus representing a portion of the ducted fan 184 located inward of the leading edge 144 of the core cowl 122. However, a calculation of the secondary fan inner fan area, $A_{S\_In}$, is based on a leading edge radius, $R_7$, of the leading edge 144 and an inner fan duct radius, defined along the radial direction R, directly inward along the radial direction R from the leading edge 144 (and not a core inlet inner radius at the core inlet 124).

Further, still, in other exemplary embodiments, other engine configurations may be provided. For example, referring nCow to FIG. 8, an engine 553 in accordance with another embodiment of the present disclosure is provided. The engine 553 of FIG. 8 may be configured in a similar manner as the exemplary engine 100 of, e.g., FIGS. 1 through 3.

Figure 8:
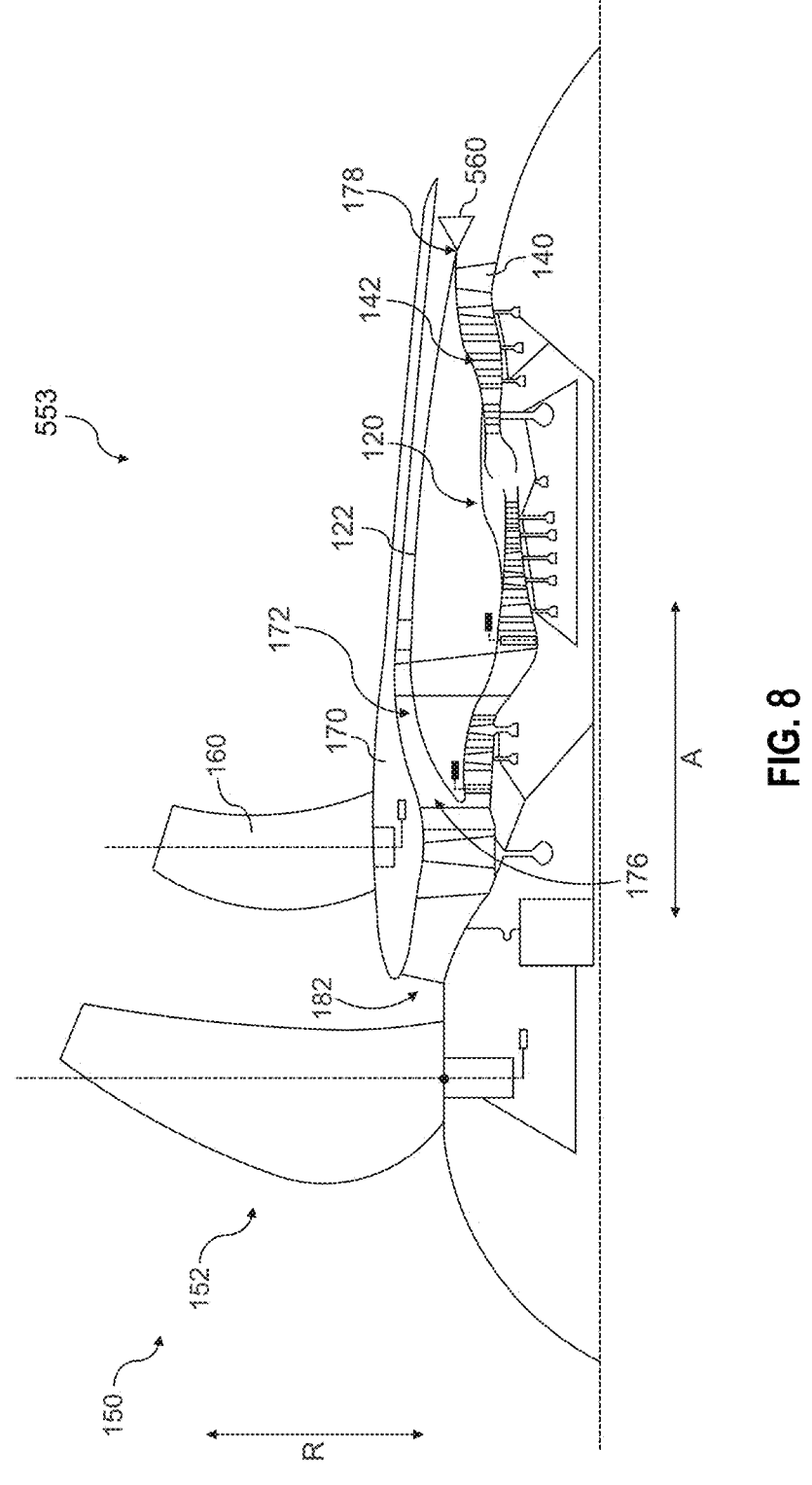
FIG. 8 is a schematic view of a gas turbine engine in accordance with still another exemplary aspect of the present disclosure.

For example, the exemplary gas turbine engine 553 of FIG. 8 includes a turbomachine 120 and a rotor assembly, also referred to a fan section 150, positioned upstream thereof. The engine 553 further includes a fan cowl 170 and a core cowl 122, the fan cowl 170 annularly encasing at least a portion of the core cowl 122 and generally positioned outward of at least a portion of the core cowl 122 along the radial direction R. Particularly, a downstream section of the fan cowl 170 extends over a forward portion of the core cowl 122 to define a fan duct flowpath, or simply fan duct 172. Incoming air may enter through the fan duct 172 through a fan duct inlet 176 and may exit through a fan exhaust nozzle 178 to produce propulsive thrust. The fan duct 172 extends from a leading edge 144 of the core cowl 122.

However, for the embodiment of FIG. 8, the fan duct 172 of the exemplary engine 553 is an elongated fan duct 172 extending between the fan cowl 170 and the core cowl 122, a full length of the core cowl 122. With such a configuration, the fan exhaust nozzle 178 is downstream of an exhaust nozzle 140 of the turbomachine 120. The engine 553 of FIG. 8 further includes a mixing device 560 in a region aft of the exhaust nozzle 140 to aid in mixing airflow from the fan duct 172 and from a working gas flowpath 142 of the turbomachine 120, e.g., to improve acoustic performance by directing airflow from the working gas flowpath 142 of the turbomachine 120 outward and from the fan duct 172 inward. In some examples, the mixing device 560 may share certain similar features with the chevrons 618, which are described later herein. Mixing in such a manner may improve performance and noise emissions.

Moreover, in other exemplary embodiments of the present disclosure, a gas turbine engine may have still other suitable configurations. For example, in other embodiments, the gas turbine engine may include any suitable number of shafts or spools, compressors, or turbines (e.g., the gas turbine engine may be a three-spool engine having three turbines and associated spools).

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1-3 and 6-8. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. For example, in some embodiments of the present disclosure, the gas turbine engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1.

For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio $R_1/R_2$ may be between 1 and 10, or 2 and 7, or at least 3.3, at least 3.5, at least 4 and less than or equal to 7, where $R_1$ is the radius of the primary fan and $R_2$ is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.0 to 4.5, within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter ($D_{core}$), which may be thought of as the maximum extent from a centerline axis (datum for R). In certain embodiments, the engine includes a length (L) from a longitudinally (or axial) forward end to a longitudinally aft end. In various embodiments, the engine defines a ratio of $L/D_{core}$ that provides for reduced installed drag. In one embodiment, $L/D_{core}$ is at least 2. In another embodiment, $L/D_{core}$ is at least 2.5. In some embodiments, the $L/D_{core}$ is less than 5, less than 4, and less than 3. In various embodiments, it should be appreciated that the $L/D_{core}$ is for a single unducted rotor engine, such as any one of the unducted rotor engines disclosed herein.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine ($D_{core}$) of the engine, $L/D_{core}$ of the engine, desired cruise altitude, and/or desired operating cruise speed, or combinations thereof.

As previously discussed with respect to FIG. 8, gas turbine engines (e.g., gas turbine engine 553) can include mixing devices to aid in mixing airflows exiting the gas turbine engines. In some examples, such mixing devices can improve acoustic performance (i.e., reduce noise emissions) by directing airflow from the working gas flowpaths outwards and directing airflows from fan ducts inward. Mixing in such a manner may improve performance and noise emissions.

Thus, referring now generally to FIGS. 9 through 18, in exemplary embodiments of the present disclosure, a gas turbine engine (e.g., the gas turbine engine 100 of FIG. 1) can include a plurality of mixing devices, wherein the mixing devices are in the form of chevrons 618. One exemplary difference between the mixing device 560 of FIG.

Figure 9:
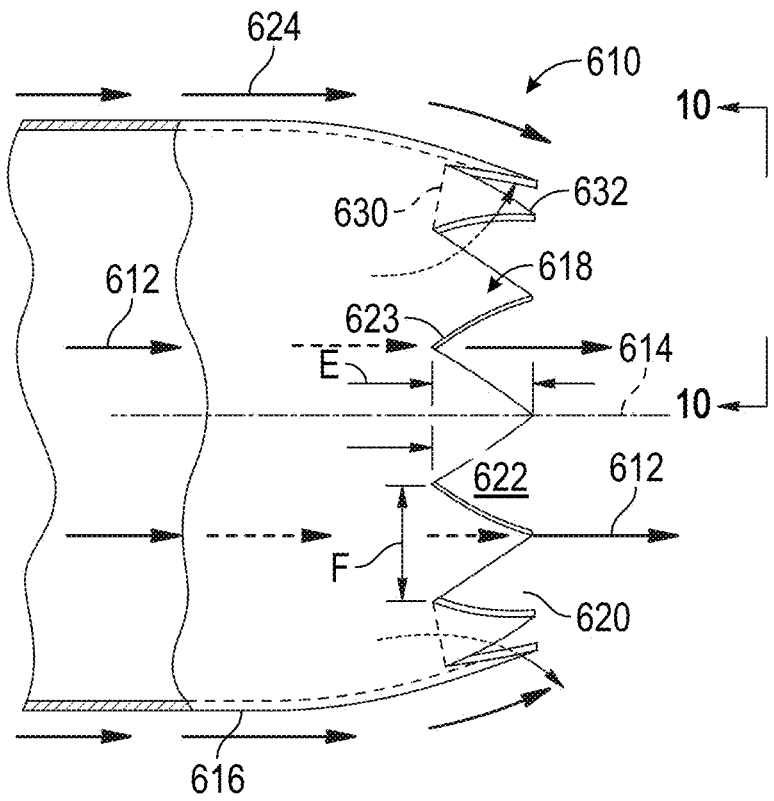
FIG. 9 is a sectional axial side view of a portion of an exemplary fan duct exhaust nozzle having an exhaust outlet defined by a plurality of adjoining chevrons in accordance with an exemplary embodiment of the present disclosure.

8 and the chevrons 618 of FIG. 9 is that the chevrons 618 are disposed at an exhaust outlet or another aft end portion of the fan exhaust nozzle 178 (FIG. 1).

The inventors have found that the chevrons disclosed herein are particularly useful for engines with TPAR ranges and CBR ranges described herein. For example, TPAR ranges between 3.5 and 100 CBR ranges between 0.1 and 10 particularly benefit from the ability of the chevrons to enhance the mixing of exhaust streams, which is crucial for reducing noise emissions and optimizing aircraft performance.

The disclosed chevrons promote the mixing of adjacent flow streams, such as the first stream (free stream) and the third stream (bypass stream). This mixing is highly beneficial for the disclosed TPAR and CBR ranges, as it helps to smooth out the velocity gradients between the different streams, leading to improved noise reduction and overall improved engine operation. As an example, engines with the TPAR and CBR ranges described herein can be susceptible to greater noise generation, especially during high-speed cruise conditions. The enhanced mixing of the exhaust streams achieved by the disclosed chevrons leads to a more uniform and stable exhaust flow under the TPAR and CBR ranges disclosed herein, which translates to reduced noise and thus better performance.

As discussed herein, the chevrons 618 of the present disclosure promote jet exhaust mixing between adjacent flow streams, i.e., a first stream 680 (FIGS. 1 and 6-9) that travels outside of the engine inlet 182 (FIG. 1) and a third stream 684 (FIG. 1) that travels through the fan duct 172 (FIG. 1) and out the fan exhaust nozzle 178 (FIG. 1) that includes chevrons 618. Such mixing promoted by the chevrons 618 reduces jet noise, e.g., cabin and community noise, and enables a quieter overall engine and aircraft, thus conferring additional similar benefits as the mixing device 560 of FIG. 8.

Referring now to FIG. 9, a sectional axial side view of a portion of an exemplary fan duct exhaust nozzle 610 having an exhaust outlet 620 defined by a plurality of adjoining chevrons 618 in accordance with an exemplary embodiment of the present disclosure is provided.

Still referring to FIG. 9, in an exemplary embodiment, the exhaust nozzle 610 for exhausting a gas jet 612, e.g., a third stream through the fan duct 172 (FIG. 1), from a conventional gas turbine engine (e.g., gas turbine engine 100 shown in FIG. 1) is shown. The exhaust nozzle 610 is axisymmetric about an axial centerline axis 614, and includes an annular exhaust duct 616, e.g., fan duct 172 shown in FIG. 1, for channeling the exhaust gas jet 612 therethrough along the centerline axis 614. The exhaust nozzle 610 also includes a plurality of circumferentially or laterally adjoining chevrons 618 integrally disposed at an aft end of the exhaust duct 616 to define the exhaust outlet 620, e.g., the exhaust outlet of fan duct 172 shown in FIG. 1.

Figure 10:
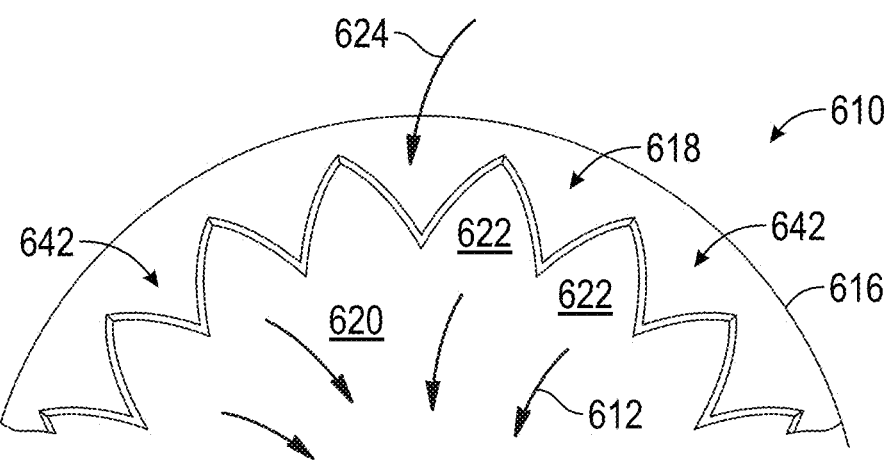
FIG. 10 is an aft facing forward view of a portion of the exhaust nozzle illustrated in FIG. 9 and taken generally along line 9-9 in accordance with an exemplary embodiment of the present disclosure.
Figure 11:
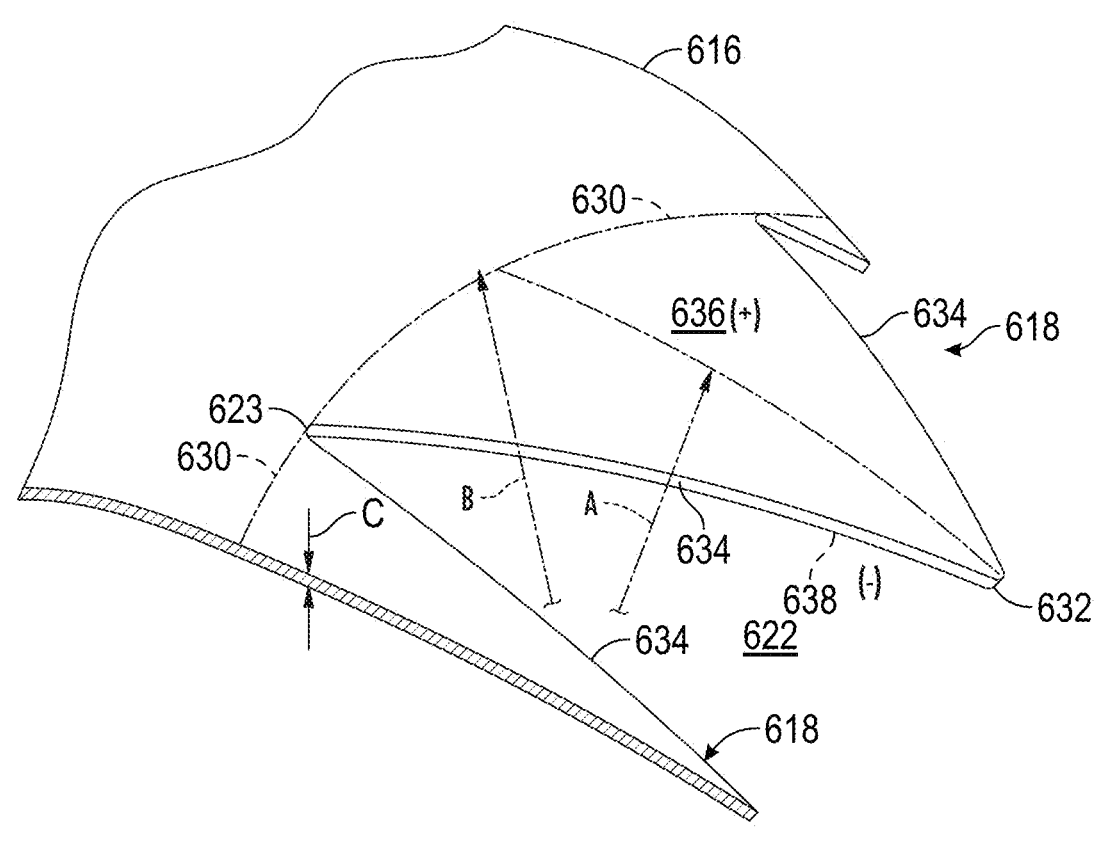
FIG. 11 is a perspective view of an exemplary chevron in accordance with an exemplary embodiment of the present disclosure.

Referring now to FIG. 10, an aft facing forward view of a portion of the exhaust nozzle 610 illustrated and taken generally along line 10-10 in accordance with an exemplary embodiment of the present disclosure is provided. Referring now also to FIG. 11, a perspective view of an exemplary chevron 618 in accordance with an exemplary embodiment of the present disclosure is provided.

Referring to FIGS. 10 and 11, in an exemplary embodiment, the plurality of chevrons 618 are each triangular in configuration.

In such a configuration, each chevron 618 includes a base 630 fixedly or integrally joined to an aft end of the exhaust duct 616 circumferentially or laterally coextensively with adjacent chevron bases 630. Each chevron 618 also includes an axially opposite apex 632, and a pair of circumferentially or laterally opposite trailing edges or sides 634 converging from the base 630 to the respective apex 632 in the downstream, aft direction. Each chevron 618 also includes a superior triangular surface 636, and an opposite inferior triangular surface 638 bounded by the trailing edges 634 and base 630.

In an exemplary embodiment, the trailing edges 634 of adjacent chevrons 618 are spaced circumferentially or laterally apart from the bases 630 to apexes 632 to define respective slots or cut-outs 622 diverging laterally and axially, and disposed in flow communication with the inside of the exhaust duct 616 for channeling flow radially therethrough.

Referring to FIGS. 9-11, the slots 622 are also triangular and complementary with the triangular chevrons 618 and diverge axially aft from a slot base 623, which is circumferentially coextensive with the chevrons bases 630 to the chevron apexes 632.

Referring again to FIG. 11, the exhaust gas jet 612 flows inside the exhaust duct 616 and is discharged both axially from its aft exhaust outlet 620 and radially outwardly through the chevron slots 622. The discharged exhaust gas jet 612 may therefore mix with a radially outwardly surrounding outer gas stream 624 which, for example, may be ambient air flowing over the exhaust nozzle 610 either during aircraft ground static or flight, or may alternatively be fan air discharged from the gas turbine engine fan nozzle. Since the exhaust nozzle 610 may be used in various applications, the exhaust gas jet 612 and outer gas stream 624 may be any fluid streams typically found in a gas turbine engine, or in industrial applications involving gas handling and/or discharging apparatus.

Referring now to FIG. 10, in an exemplary embodiment, the plurality of chevrons 618 each have an equal length. Referring still to FIG. 10, in an exemplary embodiment, the plurality of chevrons 618 each have an equal width.

Figure 12:
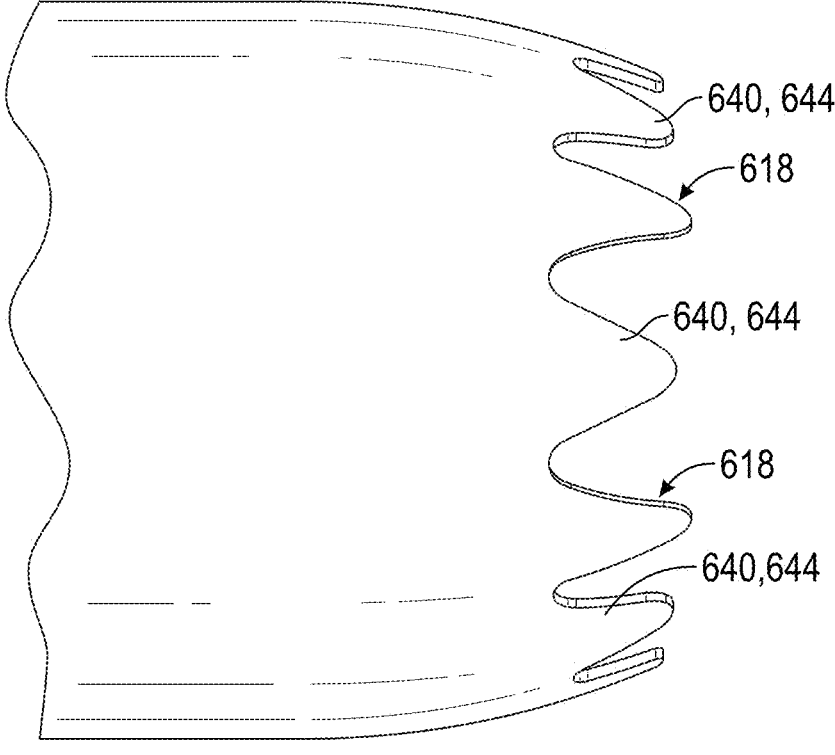
FIG. 12 is an axial side view of a portion of an exemplary fan duct exhaust nozzle having an exhaust outlet defined by a plurality of adjoining chevrons in accordance with another exemplary embodiment of the present disclosure.

Referring now to FIG. 12, an axial side view of a portion of an exemplary fan duct exhaust nozzle 610 having the exhaust outlet 620 defined by a plurality of adjoining chevrons 618 in accordance with another exemplary embodiment of the present disclosure is provided.

In the exemplary embodiment of FIG. 12, the plurality of chevrons 618 are each scalloped in configuration. For example, each chevron 618 includes a scallop shaped portion 640.

In other exemplary embodiments, it is contemplated that the plurality of chevrons 618 include first chevrons 642 (FIG. 10) having a first geometric shape and second chevrons 644 (FIG. 12) having a second geometric shape different than the first geometric shape. For example, the first chevrons 642 can be triangular in configuration and the second chevrons 644 can be scalloped in configuration.

Figure 13:
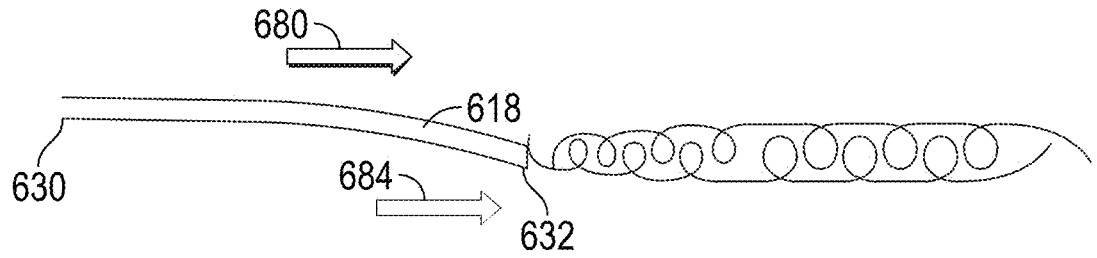
FIG. 13 is a schematic cross-sectional view of a chevron that is concave or inward penetrating in configuration in accordance with an exemplary embodiment of the present disclosure.
Figure 14:
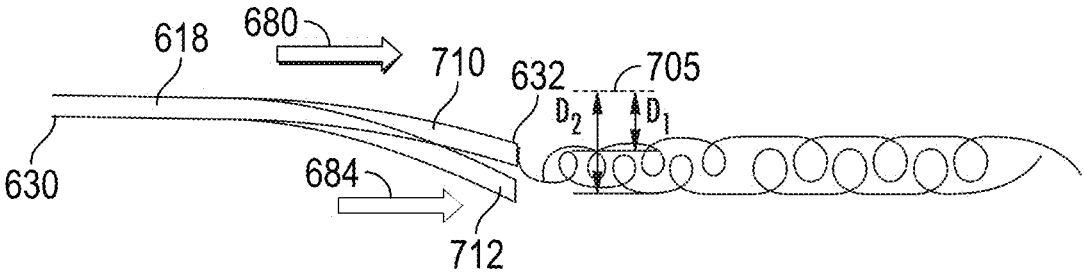
FIG. 14 is a schematic cross-sectional view of chevrons that are concave or inward penetrating in configuration in accordance with an exemplary embodiment of the present disclosure.

Referring now to FIGS. 13 and 14, simplified, schematic views of the chevron 618 for the fan duct 172 (FIG. 1) that are concave or inward penetrating in configuration in accordance with another exemplary aspect of the present disclosure are provided.

Referring now to FIGS. 11, 13 and 14, in an exemplary embodiment, each chevron 618 has a concave contour axially between the respective bases 630 and apexes 632. The axial contour is defined by a first radius of curvature A (FIG. 11) disposed in the exemplary vertical plane including the centerline axis 614 (FIG. 9). The radius A of the axial contour may vary in magnitude from the chevron base 630 to the chevron apex 632, and in the exemplary embodiment the axial contour is parabolic.

In an exemplary embodiment, the individual chevrons 618 also have a concave contour circumferentially or laterally between the trailing edges 634 as defined by a second radius of curvature B (FIG. 11). The radius B of the lateral contour may also vary along the circumferential arc between the opposite trailing edges 634 of each chevron 618, and preferably provides a smooth surface with the firstly defined axial contours. In this way, the chevron has a compound, three-dimensional flow surface contour defining a shallow concave depression or bowl for promoting mixing effectiveness. The compound curvatures may be defined by simple circular arcs, or by parabolic curves, or by higher order quadratic curves.

In an exemplary embodiment, the chevrons 618 have a substantially uniform thickness C (FIG. 11) which may also be equal to the thickness of the exhaust duct 616 (FIG. 9) from which they extend, and may be formed of one or more thin walled members or plates. Alternatively, the chevrons may vary in thickness to allow for structural rigidity and flow surface blending. In the exemplary embodiment illustrated in FIG. 11, the chevron superior triangular surface 636 is convex as represented by the plus sign (+), with the chevron inferior triangular surface 638 being concave as represented by the minus sign (−).

Although the individual chevrons 618, for example, could be flat components suitably inclined to define either a converging or diverging nozzle, the chevrons 618 have a slight, compound curvature for cooperating with the gas flow for promoting mixing effectiveness while at the same time providing an aerodynamically smooth and non-disruptive profile for minimizing losses in aerodynamic efficiency and performance.

For example, in the embodiment illustrated in FIG. 11, the superior triangular surface 636 is disposed radially outwardly of the inferior triangular surface 638 with the superior triangular surface 636 being convex, and the inferior triangular surface 638 being concave. The chevrons 618 and cooperating slots 622 are generally laterally or circumferentially coextensive with each other at generally common radii from the bases 630 to the apexes 632 for minimizing or reducing radial projection of the chevrons 618 into the exhaust gas jet 612. In the exemplary embodiment illustrated in FIGS. 9-11, the exhaust nozzle 610 is configured as a converging nozzle of decreasing flow area with an effective throat of minimum flow area being defined at a suitable location between the chevron bases 630 and apexes 632. The individual chevrons 618 are therefore inclined radially inwardly from their forward bases 630 to their aft apexes 632 and thusly confine the exhaust gas jet 612 radially therebelow. However, the slots 622 allow the exhaust gas jet 612 to expand radially outwardly therethrough for promoting forced mixing.

Figure 17:
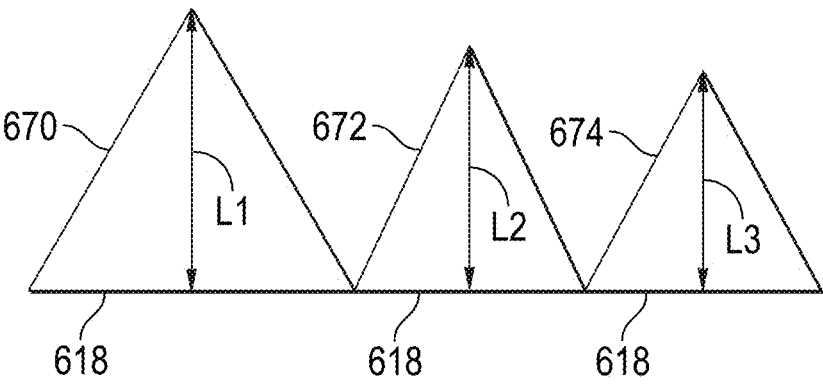
FIG. 17 is a schematic cross-sectional view of chevrons having varying lengths in accordance with an exemplary embodiment of the present disclosure.

As shown in FIG. 14, a chevron of the present disclosure can have a concave contour of a varying depth. For example, a first chevron 710 may inwardly penetrate a first distance D1 from a chevron centerline 705 and a second chevron 712 may inwardly penetrate a second distance D2 from the chevron centerline 705. As shown in FIG. 17, the second distance D2 is greater than the first distance D1.

Referring to FIGS. 13 and 14, two of the three streams of an unducted fan open rotor are shown. For example, illustrated are the first stream 680 and the third stream 684. In the exemplary embodiment depicted, the first stream 680 travels outside of the engine inlet 182 (FIG. 1). Furthermore, the third stream 684 travels through the fan duct 172 (FIG. 1)

and out the fan exhaust nozzle 178 (FIG. 1) that includes chevrons 618. Referring to FIG. 1, the second stream or core stream 682 is also shown along with the first stream 680 and the third stream 684.

Referring to FIGS. 13 and 14, in an exemplary embodiment, the chevrons 618 that are concave or inward penetrating in configuration promote jet exhaust mixing between adjacent flow streams, i.e., the first stream 680 that travels outside of the engine inlet 182 (FIG. 1) and the third stream 684 that travels through the fan duct 172 (FIG. 1) and out the fan exhaust nozzle 178 (FIG. 1) that includes chevrons 618. Such mixing promoted by chevrons 618 reduces jet noise, e.g., cabin and community noise, and enables a quieter overall engine and aircraft.

Furthermore, the chevrons 618 of the present disclosure penetrate into the streams 680, 684 to promote mixing and also reduce shock cell noise resulting in cabin noise reduction during high speed cruise conditions.

Figure 15:
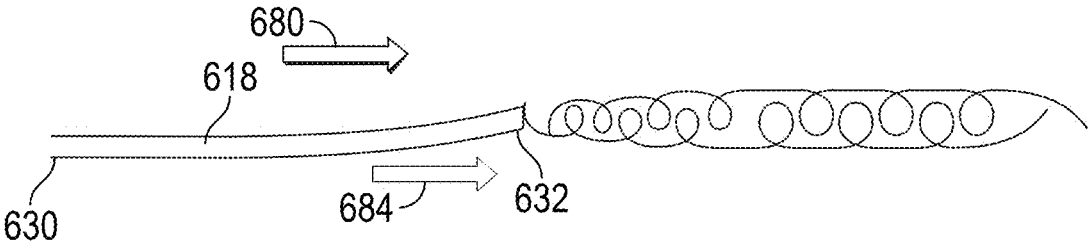
FIG. 15 is a schematic cross-sectional view of a chevron that is convex or outward extending in configuration in accordance with an exemplary embodiment of the present disclosure.
Figure 16:
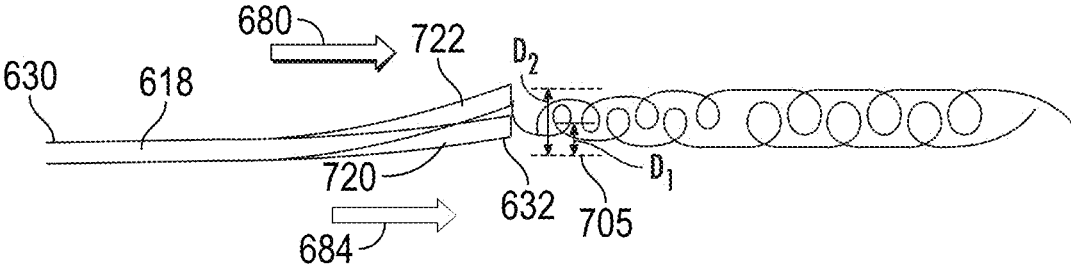
FIG. 16 is a schematic cross-sectional view of chevrons that are convex or outward extending in configuration in accordance with an exemplary embodiment of the present disclosure.

Referring now to FIGS. 15 and 16, simplified, schematic views of a chevron 618 for a fan duct 172 (FIG. 1) that are convex or outward extending in configuration in accordance with another exemplary aspect of the present disclosure are provided.

In an exemplary embodiment, each chevron 618 has a convex contour axially between the respective bases 630 and apexes 632.

As shown in FIG. 16, a chevron of the present disclosure can have a convex contour of a varying depth. For example, a first chevron 720 may outwardly extend a first distance D1 from a chevron centerline 705 and a second chevron 722 may outwardly extend a second distance D2 from the chevron centerline 705. As shown in FIG. 20, the second distance D2 is greater than the first distance D1.

Referring to FIGS. 15 and 16, two of the three streams of an unducted fan open rotor are shown. For example, illustrated are the first stream 680 and the third stream 684. In the exemplary embodiment depicted, the first stream 680 travels outside of the engine inlet 182 (FIG. 1). Furthermore, the third stream 684 travels through the fan duct 172 (FIG. 1) and out the fan exhaust nozzle 178 (FIG. 1) that includes chevrons 618. Referring to FIG. 1, the second stream or core stream 682 is also shown along with the first stream 680 and the third stream 684.

Referring still to FIGS. 15 and 16, in an exemplary embodiment, the chevrons 618 that are convex or outward extending in configuration promote jet exhaust mixing between adjacent flow streams, i.e., the first stream 680 that travels outside of the engine inlet 182 (FIG. 1) and the third stream 684 that travels through the fan duct 172 (FIG. 1) and out the fan exhaust nozzle 178 (FIG. 1) that includes chevrons 618. Similar to the mixing promoted by the mixing device 560 (FIG. 8), the mixing promoted by chevrons 618 reduces jet noise, e.g., cabin and community noise, and enables a quieter overall engine and aircraft.

Furthermore, the chevrons 618 of the present disclosure penetrate into the streams 680, 684 to promote mixing and also reduce shock cell noise resulting in cabin noise reduction during high speed cruise conditions.

In other exemplary embodiments, it is contemplated that the plurality of chevrons 618 include first chevrons that are concave or inward penetrating in configuration (FIGS. 13 and 14) and second chevrons that are convex or outward extending in configuration (FIGS. 15 and 16). In such an embodiment, the chevrons 618 could be configured in an alternating concave and convex chevron pattern.

Referring now to FIG. 17, a simplified, schematic view of a plurality of chevrons 618 for a fan duct 172 (FIG. 1)

having varying lengths in accordance with another exemplary aspect of the present disclosure is provided.

Referring still to FIG. 17, in an exemplary embodiment, the plurality of chevrons 618 include first chevrons 670 having a first length L1 and second chevrons 672 having a second length L2 different than the first length L1. In an exemplary embodiment, the plurality of chevrons 618 further include third chevrons 674 having a third length L3 different than the second length L2.

In an exemplary embodiment, the first length L1 is greater than the second length L2 and the third length L3. Furthermore, the second length L2 is greater than the third length L3 as shown in FIG. 21.

Figure 18:
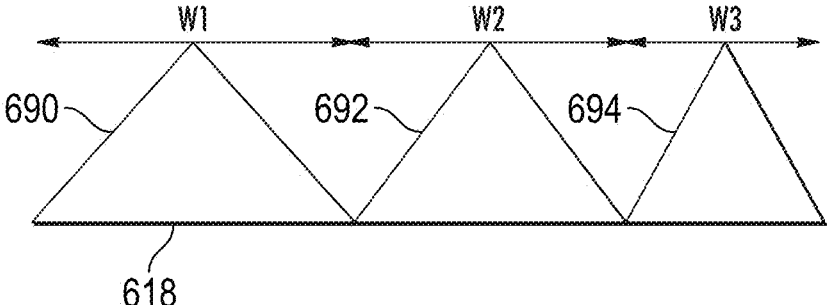
FIG. 18 is a schematic cross-sectional view of chevrons having varying widths in accordance with an exemplary embodiment of the present disclosure.

Referring now to FIG. 18, a simplified, schematic view of a plurality of chevrons 618 for a fan duct 172 (FIG. 1) having varying widths in accordance with another exemplary aspect of the present disclosure is provided.

In an exemplary embodiment, the plurality of chevrons 618 include first chevrons 690 having a first width W1 and second chevrons 692 having a second width W2 different than the first width W1. In an exemplary embodiment, the plurality of chevrons 618 further include third chevrons 694 having a third width W3 different than the second width W2.

In an exemplary embodiment, the first width W1 is greater than the second width W2 and the third width W3. Furthermore, the second width W2 is greater than the third width W3, as shown in FIG. 22.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Various additional aspects of one or more of the above-described examples are provided below. These exemplary aspects may be combined with one or more of the exemplary gas turbine engines described above with respect to the figures. Further aspects are provided by the subject matter of the following clauses:

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any clause herein, wherein the thrust to power airflow ratio and the core bypass ratio are defined when the gas turbine engine is operated at a rated speed during standard day operating conditions.

The gas turbine engine of any clause herein, wherein the thrust to power airflow ratio between 4 and 75.

The gas turbine engine of any clause herein, wherein the primary fan is an unducted primary fan, and wherein the thrust to power airflow ratio between 30 and 60.

The gas turbine engine of any clause herein, wherein the thrust to power airflow ratio between 35 and 50.

The gas turbine engine of any clause herein, wherein the core bypass ratio between 0.3 and 5.

The gas turbine engine of any clause herein, wherein the gas turbine engine is a direct drive gas turbine engine, and wherein the thrust to power airflow ratio is between 3.5 and 20.

The gas turbine engine of any clause herein, wherein the gas turbine engine is a geared gas turbine engine, and wherein the thrust to power airflow ratio is between 8 and 40.

The gas turbine engine of any clause herein, wherein the secondary fan is a single stage secondary fan.

The gas turbine engine of any clause herein, wherein the secondary fan is a multi-stage secondary fan.

The gas turbine engine of any clause herein, wherein the multi-stage secondary fan is a two stage secondary fan.

The gas turbine engine of any clause herein, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any clause herein, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

The gas turbine engine of any clause herein, wherein the primary fan, the secondary fan, the compressor section, the combustion section, and the turbine section are arranged in serial flow order.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any clause herein, wherein the gas turbine engine of claim 1, wherein the thrust to power airflow ratio between 4 and 75.

The method of any clause herein, wherein the primary fan is an unducted primary fan, and wherein the thrust to power airflow ratio between 30 and 60.

The method of any clause herein, wherein the thrust to power airflow ratio between 35 and 50.

The method of any clause herein, wherein the core bypass ratio between 0.3 and 5.

A propulsion system defining a radial direction, comprising: a rotating element; a stationary element; an inlet assembly defining an inlet positioned between the rotating element and the stationary element and positioned inward of the stationary element along the radial direction, the inlet assembly comprising an inlet duct located downstream of the inlet; and a ducted fan comprising a plurality of fan blades positioned at least partially in the inlet duct; wherein the inlet duct divides into a first duct and a second duct separate from the first duct, wherein the first duct is a core duct downstream of the ducted fan, wherein the second duct is a fan duct downstream of the ducted fan, wherein the second duct is outward of the first duct along the radial direction, and wherein the second duct includes an exhaust nozzle having a plurality of chevrons disposed at an aft end of the exhaust nozzle to define an exhaust outlet.

The propulsion system of any clause herein, wherein the plurality of chevrons are each triangular in configuration.

The propulsion system of any clause herein, wherein the plurality of chevrons are each scalloped in configuration.

The propulsion system of any clause herein, wherein the plurality of chevrons include first chevrons having a first geometric shape and second chevrons having a second geometric shape different than the first geometric shape.

The propulsion system of any clause herein, wherein the plurality of chevrons are each concave in configuration.

The propulsion system of any clause herein, wherein the plurality of chevrons are each convex in configuration.

The propulsion system of any clause herein, wherein the plurality of chevrons include first chevrons that are concave in configuration and second chevrons that are convex in configuration.

The propulsion system of any clause herein, wherein the plurality of chevrons each have an equal length.

The propulsion system of any clause herein, wherein the plurality of chevrons include first chevrons having a first length and second chevrons having a second length different than the first length.

The propulsion system of any clause herein, wherein the plurality of chevrons each have an equal base width.

The propulsion system of any clause herein, wherein the plurality of chevrons include first chevrons having a first width and second chevrons having a second width different than the first width.

The propulsion system of any clause herein, wherein the rotating element is an unducted rotating element.

The propulsion system of any clause herein, wherein the rotating element has an axis of rotation and a plurality of blades, wherein the stationary element has a plurality of vanes, and wherein the plurality of vanes do not rotate about the axis of rotation.

The propulsion system of any clause herein, wherein the first duct fluidly communicates with a core of a gas turbine engine.

The propulsion system of any clause herein, wherein the core of the gas turbine engine includes a core exhaust nozzle, and wherein the first duct includes the core exhaust nozzle.

The propulsion system of any clause herein, wherein the exhaust nozzle is a fan nozzle separate and spaced from the core exhaust nozzle.

An inlet assembly for an aircraft having a propulsion system defining a radial direction, the propulsion system including a rotating element and a stationary element, the inlet assembly defining an inlet positioned between the rotating element and the stationary element and positioned inward of the stationary element along the radial direction, the inlet assembly comprising: an inlet duct located downstream of the inlet; and a ducted fan comprising a plurality of fan blades positioned at least partially in the inlet duct;

wherein the inlet duct divides into a first duct and a second duct separate from the first duct, wherein the first duct is a core duct downstream of the ducted fan, wherein the second duct is a fan duct downstream of the ducted fan, wherein the second duct is outward of the first duct along the radial direction, and wherein the second duct includes an exhaust nozzle having a plurality of chevrons disposed at an aft end of the exhaust nozzle to define an exhaust outlet.

The inlet assembly of any clause herein, wherein the plurality of chevrons are each triangular in configuration.

The inlet assembly of any clause herein, wherein the plurality of chevrons are each scalloped in configuration.

A method of operating a propulsion system, comprising: operating a first rotating fan assembly to produce a first stream of air; directing a portion of the first stream of air into a second ducted rotating fan assembly; operating the second ducted rotating fan assembly to produce a second stream of air; dividing the second stream of air into a core stream and a fan stream; directing the core stream into a core of a gas turbine engine; and directing the fan stream through a duct including an exhaust nozzle having a plurality of chevrons disposed at an aft end of the exhaust nozzle to define an exhaust outlet.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, wherein the core bypass ratio is a ratio of the airflow through the fan duct to the airflow through the core duct, and wherein the fan duct includes a fan exhaust nozzle having a plurality of chevrons disposed at an aft end of the fan exhaust nozzle to define a fan exhaust outlet.

The gas turbine engine of any clause herein, wherein the thrust to power airflow ratio and the core bypass ratio are defined when the gas turbine engine is operated at a rated speed during standard day operating conditions.

The gas turbine engine of any clause herein, wherein the thrust to power airflow ratio is between 4 and 75.

The gas turbine engine of any clause herein, wherein the thrust to power airflow ratio is between 30 and 60.

The gas turbine engine of any clause herein, wherein the thrust to power airflow ratio is between 35 and 50.

The gas turbine engine of any clause herein, wherein the core bypass ratio is between 0.3 and 5.

The gas turbine engine of any clause herein, wherein the core bypass ratio is between 0.5 and 3.

The gas turbine engine of any clause herein, wherein the secondary fan is a single stage secondary fan.

The gas turbine engine of any clause herein, wherein the secondary fan is a multi-stage secondary fan.

The gas turbine engine of any clause herein, wherein the primary fan is an unducted primary fan.

The gas turbine engine of any clause herein, wherein core duct includes a core exhaust nozzle having at least one mixing device.

The gas turbine engine of any clause herein, wherein the plurality of chevrons are each triangular in configuration.

The gas turbine engine of any clause herein, wherein the plurality of chevrons include first chevrons having a first geometric shape and second chevrons having a second geometric shape different than the first geometric shape.

The gas turbine engine of any clause herein, wherein the plurality of chevrons include first chevrons that are concave in configuration and second chevrons that are convex in configuration.

The gas turbine engine of any clause herein, wherein the plurality of chevrons include first chevrons having a first length and second chevrons having a second length different than the first length.

The gas turbine engine of any clause herein, wherein the plurality of chevrons include first chevrons having a first width and second chevrons having a second width different than the first width.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, wherein the core bypass ratio is a ratio of the airflow through the fan duct to the airflow through the core duct, and wherein the fan duct includes an exhaust nozzle having a plurality of chevrons disposed at an aft end of the exhaust nozzle to define an exhaust outlet.

The method of any clause herein, wherein the gas turbine engine of claim 1,
wherein the thrust to power airflow ratio between 14 and 75.

The method of any clause herein, wherein the primary fan is an unducted primary fan, and wherein the thrust to power airflow ratio between 30 and 60.

The method of any clause herein, wherein the core bypass ratio between 0.3 and 5.

The method of any clause herein, wherein the plurality of chevrons include first chevrons having a first geometric shape and second chevrons having a second geometric shape different than the first geometric shape.

We claim:
1. A gas turbine engine comprising:
a turbomachine comprising a compressor section, a combustion section, and a turbine section arranged in serial flow order, the turbomachine defining an engine inlet to an inlet duct, a fan duct inlet to a fan duct, and a core inlet to a core duct;
a primary fan driven by the turbomachine; and
a secondary fan located downstream of the primary fan within the inlet duct,
the gas turbine engine defining a thrust to power airflow ratio between 3.5 and 100 and a core bypass ratio between 0.1 and 10,
wherein the thrust to power airflow ratio is a ratio of an airflow through a bypass passage over the turbomachine plus an airflow through the fan duct to an airflow through the core duct,
wherein the core bypass ratio is a ratio of the airflow through the fan duct to the airflow through the core duct, and
wherein the fan duct includes a fan exhaust nozzle having a plurality of chevrons disposed at an aft end of the fan exhaust nozzle to define an exhaust outlet.
2. The gas turbine engine of claim 1, wherein the thrust to power airflow ratio and the core bypass ratio are defined when the gas turbine engine is operated at a rated speed during standard day operating conditions.

3. The gas turbine engine of claim 1, wherein the thrust to power airflow ratio is between 14 and 75.

4. The gas turbine engine of claim 1, wherein the thrust to power airflow ratio is between 35 and 50.

5. The gas turbine engine of claim 1, wherein the core bypass ratio is between 0.3 and 5.

6. The gas turbine engine of claim 1, wherein the core bypass ratio is between 0.5 and 3.

7. The gas turbine engine of claim 1, wherein the secondary fan is a single stage secondary fan.

8. The gas turbine engine of claim 1, wherein the secondary fan is a multi-stage secondary fan.

9. The gas turbine engine of claim 1, wherein the primary fan is an unducted primary fan.

10. The gas turbine engine of claim 1, wherein core duct includes a core exhaust nozzle having at least one mixing device.

11. The gas turbine engine of claim 1, wherein the plurality of chevrons are each triangular in configuration.

12. The gas turbine engine of claim 1, wherein the plurality of chevrons include first chevrons having a first geometric shape and second chevrons having a second geometric shape different than the first geometric shape.

13. The gas turbine engine of claim 1, wherein the plurality of chevrons include first chevrons that are concave in configuration and second chevrons that are convex in configuration.

14. The gas turbine engine of claim 1, wherein the plurality of chevrons include first chevrons having a first length and second chevrons having a second length different than the first length.

15. The gas turbine engine of claim 1, wherein the plurality of chevrons include first chevrons having a first width and second chevrons having a second width different than the first width.

16. A method of operating a gas turbine engine, comprising:

operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, wherein the core bypass ratio is a ratio of the airflow through the fan duct to the airflow through the core duct, and wherein the fan duct includes an exhaust nozzle having a plurality of chevrons disposed at an aft end of the exhaust nozzle to define an exhaust outlet.

17. The method of claim 16, wherein the thrust to power airflow ratio is between 14 and 75.

18. The method of claim 16, wherein the primary fan is an unducted primary fan, and wherein the thrust to power airflow ratio is between 30 and 60.

19. The method of claim 16, wherein the core bypass ratio is between 0.3 and 5.

20. The method of claim 16, wherein the plurality of chevrons include first chevrons having a first geometric shape and second chevrons having a second geometric shape different than the first geometric shape.

* * * * *